(12) United States Patent
Shoap

(10) Patent No.: US 7,695,018 B2
(45) Date of Patent: *Apr. 13, 2010

(54) METHOD AND APPARATUS FOR A SHARED CRUMPLE ZONE

(76) Inventor: Stephen D. Shoap, 12 Sheffield Rd., Wakefield, MA (US) 01880

( * ) Notice: Subject to any disclaimer, the term of this patent is extended or adjusted under 35 U.S.C. 154(b) by 0 days.

This patent is subject to a terminal disclaimer.

(21) Appl. No.: 12/199,221

(22) Filed: Aug. 27, 2008

(65) Prior Publication Data

US 2009/0058113 A1    Mar. 5, 2009

Related U.S. Application Data

(63) Continuation of application No. 12/198,943, filed on Aug. 27, 2008.

(60) Provisional application No. 60/966,312, filed on Aug. 27, 2007, provisional application No. 61/068,487, filed on Mar. 7, 2008, provisional application No. 61/135,042, filed on Jul. 16, 2008.

(51) Int. Cl.
*B60R 21/02* (2006.01)

(52) U.S. Cl. .................. 280/784; 180/209; 180/232; 188/371; 188/377; 293/107; 293/109; 293/118; 293/119; 293/126; 293/128; 293/134; 293/144; 293/146; 293/147; 293/148; 293/151; 296/187.02; 296/187.03; 296/187.04; 296/187.11; 296/187.12

(58) Field of Classification Search ................. 180/209, 180/232; 188/371, 377; 280/784; 293/107, 293/109, 110, 118, 119, 126–128, 132, 134, 293/144, 146–148, 151; 296/187.02–187.04, 296/187.11, 187.12
See application file for complete search history.

(56) References Cited

U.S. PATENT DOCUMENTS

| | | | |
|---|---|---|---|
| 1,347,937 A | 7/1920 | Clary | |
| 1,643,517 A | 9/1927 | Price | |
| 2,092,476 A | 9/1937 | Schulman | |
| 3,140,111 A * | 7/1964 | Dabroski | 362/505 |
| 3,307,867 A | 3/1967 | McGovern | |
| 3,412,628 A | 11/1968 | De Gain | |
| 3,695,665 A * | 10/1972 | Matsuura | 293/110 |
| 3,774,950 A * | 11/1973 | Weller | 293/131 |
| 3,782,768 A | 1/1974 | Moore | |
| 3,797,872 A * | 3/1974 | Watanabe et al. | 293/30 |
| 3,823,968 A * | 7/1974 | Barenyi | 293/131 |
| 3,903,997 A * | 9/1975 | Brooks | 188/377 |
| 4,097,080 A | 6/1978 | Petry | |

(Continued)

FOREIGN PATENT DOCUMENTS

| | | |
|---|---|---|
| GB | 1103693 | 2/1968 |
| JP | 06-064489 A * | 3/1994 |
| WO | 2006112732 A1 | 10/2006 |

OTHER PUBLICATIONS

Toyota Motor Corporation, i-unit Overview, http://www.toyota.co.jp/en/news/04/1203_1e.html, web page accessed Jul. 31, 2007, 2 pages.

*Primary Examiner*—Ruth Ilan
*Assistant Examiner*—James English
(74) *Attorney, Agent, or Firm*—Hayes Soloway P.C.

(57) ABSTRACT

A system for absorbing impact energy includes a container formed with a plurality of faces. An energy absorbing material is substantially contained within the container. A first elongated member has a proximate end and a distal end. The proximate end is proximate and approximately perpendicular to a first face of the container. A long axis of the first elongated member intersects the first face. A first bumper is connected to the distal end of the first elongated member. A second elongated member has a proximate end and a distal end. The proximate end is proximate and approximately perpendicular to a second face of the container. A long axis of the second elongated member intersects the second face. The second elongated member is approximately perpendicular to the first elongated member. A second bumper connected to the distal end of the second elongated member.

20 Claims, 18 Drawing Sheets

U.S. PATENT DOCUMENTS

| | | | |
|---|---|---|---|
| 4,231,607 A | 11/1980 | Bohlin | |
| 4,272,103 A | 6/1981 | Schmid et al. | |
| 4,352,484 A | 10/1982 | Gertz et al. | |
| 4,394,108 A | 7/1983 | Cook et al. | |
| 4,431,221 A | 2/1984 | Jahnle | |
| 4,512,604 A | 4/1985 | Maeda et al. | |
| 4,781,398 A | 11/1988 | Uebelstadt et al. | |
| 4,830,417 A | 5/1989 | Bates et al. | |
| 4,950,522 A | 8/1990 | Vogt et al. | |
| 5,042,837 A | 8/1991 | Kleinschmit et al. | |
| 5,042,858 A * | 8/1991 | Schubert et al. | 293/24 |
| 5,072,805 A | 12/1991 | Meiners | |
| 5,219,051 A * | 6/1993 | Davis | 188/378 |
| 5,474,144 A | 12/1995 | Tarng | |
| 5,566,384 A * | 10/1996 | Chien | 362/486 |
| 5,718,549 A * | 2/1998 | Noda et al. | 411/553 |
| 5,746,418 A * | 5/1998 | Jansen | 267/136 |
| 5,782,483 A | 7/1998 | Rogers et al. | |
| 5,819,408 A | 10/1998 | Catlin | |
| 5,876,077 A * | 3/1999 | Miskech et al. | 293/132 |
| 5,968,573 A | 10/1999 | Wang | |
| 6,027,159 A * | 2/2000 | Baumann | 296/187.03 |
| 6,158,556 A * | 12/2000 | Swierczewski | 188/5 |
| 6,164,897 A | 12/2000 | Edwards | |
| 6,174,008 B1 | 1/2001 | Kramer et al. | |
| 6,220,652 B1 | 4/2001 | Browne et al. | |
| 6,302,458 B1 | 10/2001 | Wang et al. | |
| 6,308,809 B1 * | 10/2001 | Reid et al. | 188/377 |
| 6,312,028 B1 * | 11/2001 | Wilkosz | 293/133 |
| 6,374,934 B1 * | 4/2002 | Beck et al. | 180/65.51 |
| 6,401,565 B1 * | 6/2002 | Wang et al. | 74/502.4 |
| 6,409,253 B2 | 6/2002 | Larsson et al. | |
| 6,420,803 B1 | 7/2002 | Woodall et al. | |
| 6,523,885 B2 * | 2/2003 | Kroning et al. | 296/187.03 |
| 6,540,275 B1 | 4/2003 | Iwamoto et al. | |
| 6,601,873 B1 | 8/2003 | Bartesch et al. | |
| 6,623,054 B1 | 9/2003 | Palmquist | |
| 6,626,474 B1 * | 9/2003 | Ameur | 293/118 |
| 6,688,831 B2 | 2/2004 | Antonucci et al. | |
| 6,709,035 B1 | 3/2004 | Namuduri et al. | |
| 6,773,044 B2 | 8/2004 | Schambre et al. | |
| 6,834,899 B2 | 12/2004 | Lindsey | |
| 6,840,542 B2 | 1/2005 | Kim | |
| 6,869,132 B2 | 3/2005 | Wang et al. | |
| 6,893,079 B1 | 5/2005 | Johnson et al. | |
| 6,905,282 B2 | 6/2005 | Leonhardt et al. | |
| 6,908,128 B2 | 6/2005 | Strong | |
| 6,926,322 B2 * | 8/2005 | Browne et al. | 293/114 |
| 6,926,326 B2 | 8/2005 | Iyoda et al. | |
| 6,932,201 B2 | 8/2005 | Akiyama et al. | |
| 6,976,718 B2 | 12/2005 | Nakanishi | |
| 7,201,413 B2 | 4/2007 | Hillekes et al. | |
| 7,210,718 B1 * | 5/2007 | Budhu | 293/114 |
| 6,460,667 B1 | 12/2008 | Bruck et al. | |
| 2001/0013705 A1 * | 8/2001 | Okamura et al. | 293/102 |
| 2003/0168844 A1 * | 9/2003 | Borroni-Bird et al. | 280/784 |
| 2006/0006019 A1 | 1/2006 | Caserta et al. | |
| 2006/0145433 A1 | 7/2006 | Kim | |

* cited by examiner

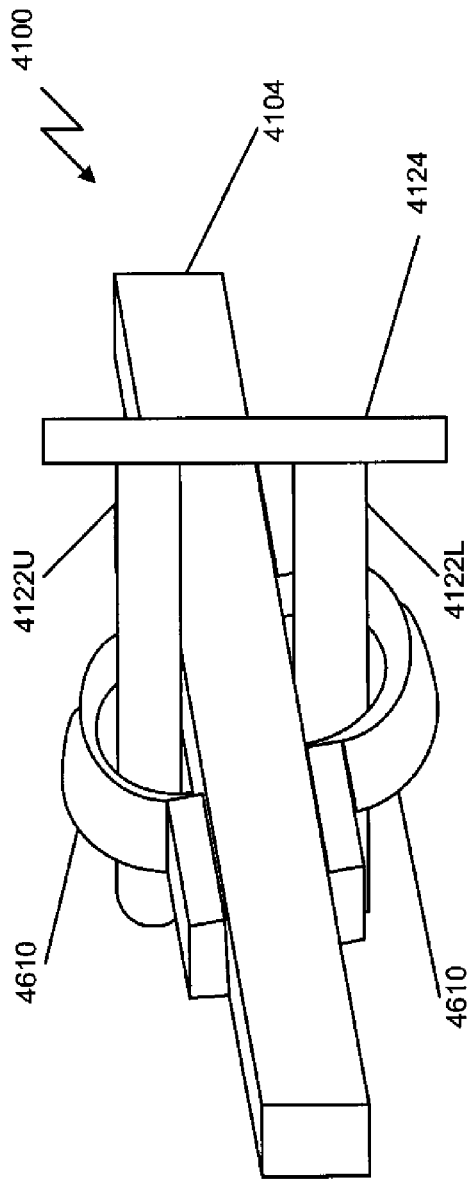
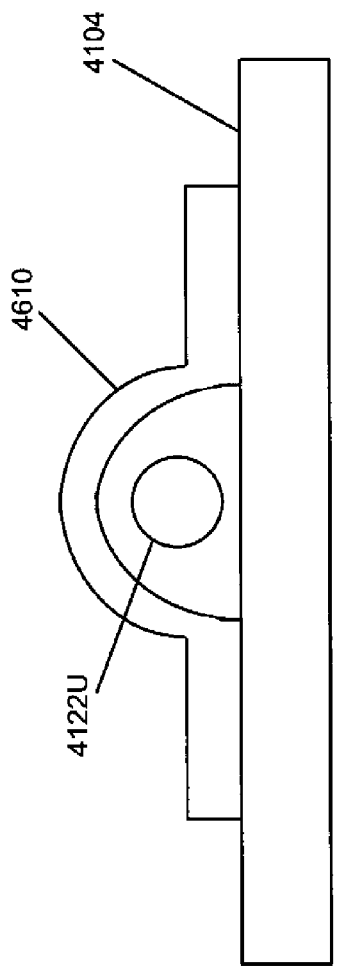
FIG. 15
FIG. 15A

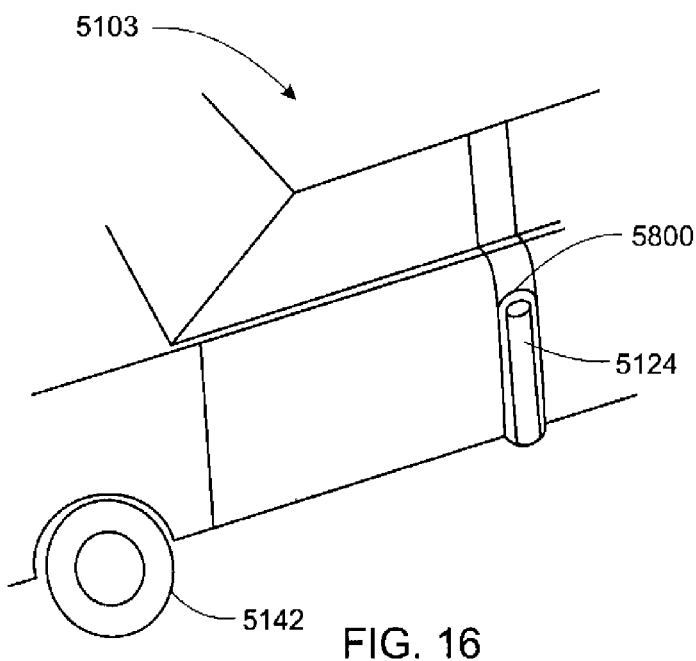
FIG. 16
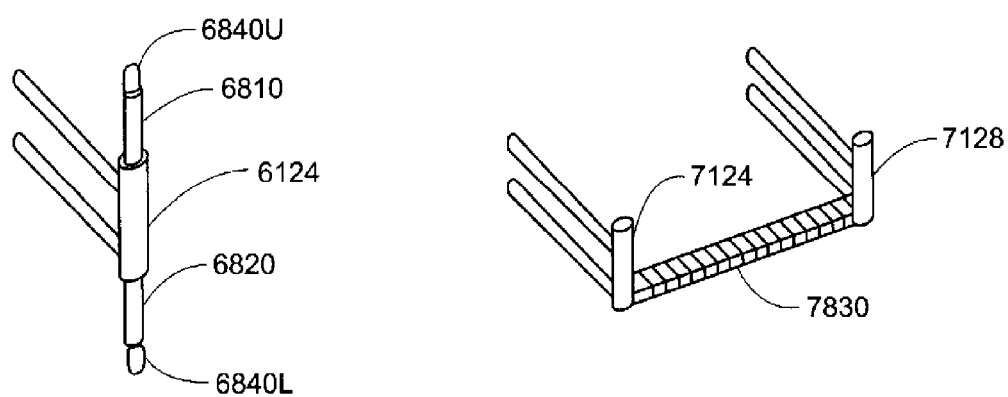
FIG. 17
FIG. 18

METHOD AND APPARATUS FOR A SHARED CRUMPLE ZONE

CROSS-REFERENCE TO RELATED APPLICATION

This application is a continuation application of pending U.S. application Ser. No. 12/198,943 filed Aug. 27, 2008 and claims priority to copending U.S. Provisional Applications entitled, "Expandable Vehicle Chassis with Comfort and Safety Enhancements," having Ser. No. 60/966,312, filed Aug. 27, 2007, and "Safer Small Car," having Ser. No. 61/068,487, filed Mar. 7, 2008, and "Additional Invention for a Safer Small Car" having Ser. No. 61/135,042 filed Jul. 16, 2008, which are entirely incorporated herein by reference.

FIELD OF THE INVENTION

The present invention is generally related to a vehicle safety system, and more particularly is related to a method and apparatus for a shared crumple zone.

BACKGROUND OF THE INVENTION

Auto engineers have made great improvements in reducing injuries caused by frontal collisions. Air bags and seat belts work well. Also, the front of most vehicles contains the engine and the engine compartment, which can be designed to operate as a "crumple zone". A crumple zone is a volume that absorbs at least a portion of the energy of a collision and lengthens the time of the collision event. The crumple zone presents a force in opposition to the collision force over a distance. By increasing the time of the collision event, and by absorbing a portion of the collision energy, the crumple zone reduces the G Forces on the vehicle occupants.

Rear collisions are a serious problem for small vehicles because the small vehicles do not have large trunk volumes comparable to the engine compartments. A small vehicle with a small trunk will offer little protection to the occupants when the vehicle is hit from the rear. Large vehicles typically have larger trunks, which can be designed to operate as an effective crumple zone.

Air bags are not useful in rear collisions because the occupants are in close contact with their seats. In a rear collision, the seats push on the bodies of the person in the seat. While there is some advantage to having the seats slide backwards in this situation, sliding seats is not an accepted practice because rear moving front seats could crush the legs of rear seat passengers.

With no crumple zone in the rear, the small vehicle exposes its passengers to very high G forces during rear collisions because motion of their bodies will change very rapidly. Force=Mass×Acceleration. The rapid velocity change of their bodies is a large acceleration and the resultant force on their bodies (masses) will be large. Also, a small vehicle will have a relatively small mass, and when it is hit in the rear by another vehicle while inert, the force from the collision on the low mass small vehicle will generate large accelerations, directly translating large accelerations and proportionally large forces on the passenger bodies.

Even if a passenger is constrained so that his body does not strike a hard surface, the high acceleration can tear internal organs and blood vessels. Similarly, the skull may move and compress and injure the brain.

Previous technology in this area has offered front, side and rear bumpers fixedly attached to springs in order to reduce damage to the vehicle from a collision. The springs may operate to absorb some of the force in a collision. Later technology had other shock absorbing devices that were placed between the bumpers and the vehicle. These devices were designed to dissipate some of the energy of the collision to reduce passenger injuries. Some of these devices allowed for the bumpers to be moved between multiple positions. These shock absorbing devices were relatively small in volume which limited the amount of energy they could absorb.

Side impact protection is a more difficult problem than frontal or rear impact protection. Vehicle sides do not traditionally have bumpers. The doors and side members of a conventional vehicle may be made from heavy gauge steel, heavier than other parts of the vehicle, in order to offer some protection for side collisions. The weight of this steel negatively affects the vehicle fuel economy.

Side air bags have been introduced to many vehicles. They are much narrower than the frontal air bags because the occupant's head is closer to the side of the vehicle than the steering wheel or dashboard. Closer proximity means that there is less time to absorb the energy of a side collision. Also, the side of a vehicle has much less steel between the passenger and an oncoming vehicle as compared to the front or rear of the vehicle and the passenger. Side collisions are much more deadly than frontal collisions.

Previous technology in this area has offered devices that were placed between the vehicle doors. They were designed to resist deformation of the vehicle chassis caused by a side collision. The devices did not extend beyond the sides of the vehicle and did not add to the side crumple distance.

Some other technology provides bumpers that remain in a retracted position until moments before an impending accident was detected. Then the bumpers would be rapidly extended. The detection of an impending accident is very difficult. There are many technologies that might be used to try to detect an impending collision, but they all suffer from the possibility of false alarms. A false alarm might injure a person who is next to the vehicle when the bumpers are deployed or cause property damage.

Thus, a heretofore unaddressed need exists in the industry to address the aforementioned deficiencies and inadequacies.

SUMMARY OF THE INVENTION

Embodiments of the present invention provide a system and method for absorbing impact energy. Briefly described, in architecture, one embodiment of the system, among others, can be implemented as follows. The system includes a container formed with a plurality of faces. An energy absorbing material is substantially contained within the container. A first elongated member has a proximate end and a distal end. The proximate end is proximate and approximately perpendicular to a first face of the container. A long axis of the first elongated member intersects the first face. A first bumper is connected to the distal end of the first elongated member. A second elongated member has a proximate end and a distal end. The proximate end is proximate and approximately perpendicular to a second face of the container. A long axis of the second elongated member intersects the second face. The second elongated member is approximately perpendicular to the first elongated member. A second bumper connected to the distal end of the second elongated member.

The present invention can also be viewed as providing methods for absorbing impact energy. In this regard, one embodiment of such a method, among others, can be broadly summarized by the following steps: receiving an impact force at a first elongated member connected to a container formed with a plurality of walls; translating the impact force, at least partially, to the container, wherein a second elongated member is connected to the container and extends therefrom, wherein the second elongated member is approximately perpendicular to the first elongated member; and absorbing at least a portion of the impact force with an energy absorbing material substantially contained within the container.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 15 is a perspective view of a portion of an assembly, in accordance with a fifth exemplary embodiment of the present invention.

FIG. 15A is a detail view of a portion of the assembly shown in FIG. 15, in accordance with the fifth exemplary embodiment of the present invention.

FIG. 16 is a perspective view of a portion of the vehicle, in accordance with a sixth exemplary embodiment of the present invention.

FIG. 17 is an illustration of a side bumper, in accordance with a seventh exemplary embodiment of the present invention.

FIG. 18 shows a pair of side bumpers, in accordance with an eighth exemplary embodiment of the present invention.

DETAILED DESCRIPTION

Figure 1:
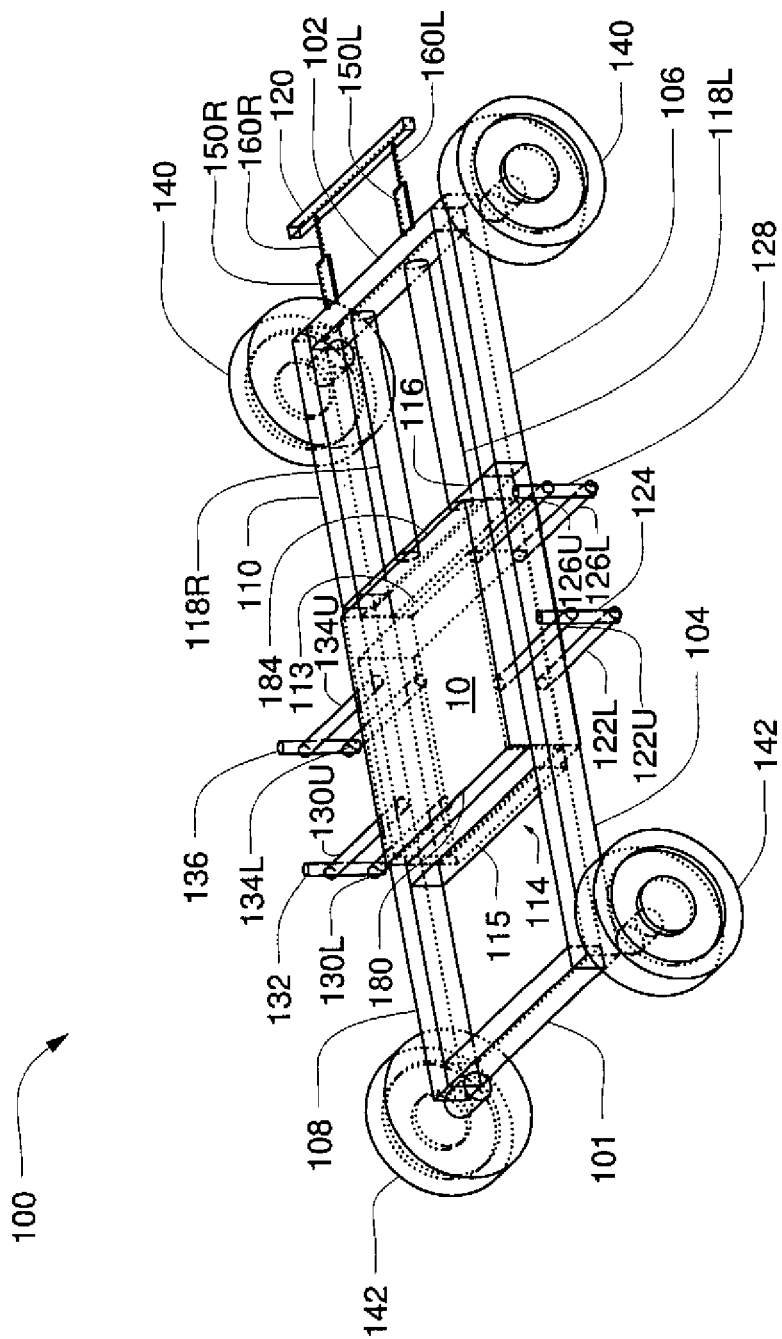
FIG. 1 is an illustration of a perspective view of an assembly, in accordance with the first exemplary embodiment of the present invention.

FIG. 1 is an illustration of a perspective view of an assembly 100, in accordance with the first exemplary embodiment of the present invention. The assembly 100 is a frame of a body-on-frame type of automotive chassis construction. An auto body (not shown) is placed on top of the frame to complete the construction of the vehicle.

As shown in FIG. 1, a proximal end of a front bumper beam 101 is connected to a left side rail 104, which is connected slidably to a left movable side rail 106. A distal end of the front bumper beam 101 is connected to a right side rail 108, which is connected slidably to a right movable side rail 110. A distal end of a rear bumper beam 102 is connected to the right movable side rail 110 and a proximal end of the rear bumper beam 102 is connected to the left moveable side rail 106.

The movable side rails 106, 110 are arranged to slide or telescope into and out of the side rails 104, 108. The side rails 104, 108 will be at least partially hollow, but constructed of a sufficiently rigid material to support the percentage of mass of the vehicle typically supported by a side rail. Bearings or wheels may be provided both within the side rails 104, 108 and along an exterior portion of the movable side rails 106, 110 to allow the telescoping to occur smoothly. Telescoping will be controlled by rear control units 200L, 200R (shown in FIG. 2), as will be discussed further herein.

A rear bumper 120 may be attached to a right rear bumper bracket 150R and a left rear bumper bracket 150L with a right spring 160R and a left spring 160L, respectively. The right rear bumper bracket 150R and the left rear bumper bracket 150L may be connected to the rear bumper beam 102.

A front cross beam 115 and a rear cross beam 116 may be located between and approximately parallel to the front bumper beam 101 and the rear bumper beam 102. The front cross beam 115 and the rear cross beam 116 may connect to both the right side rail 108 and the left side rail 104.

An energy absorbing container 10 (also referenced herein as a crumple zone box, or crumple box) is a hollow rectangular box, container, or rectangular prism, with a front side 180, a right side 182 (shown in FIG. 2), a left side 186 (shown in FIG. 2), and a rear side 184. The energy absorbing container 10 may also include a bottom plate 114 and a top plate 113.

Figure 2:
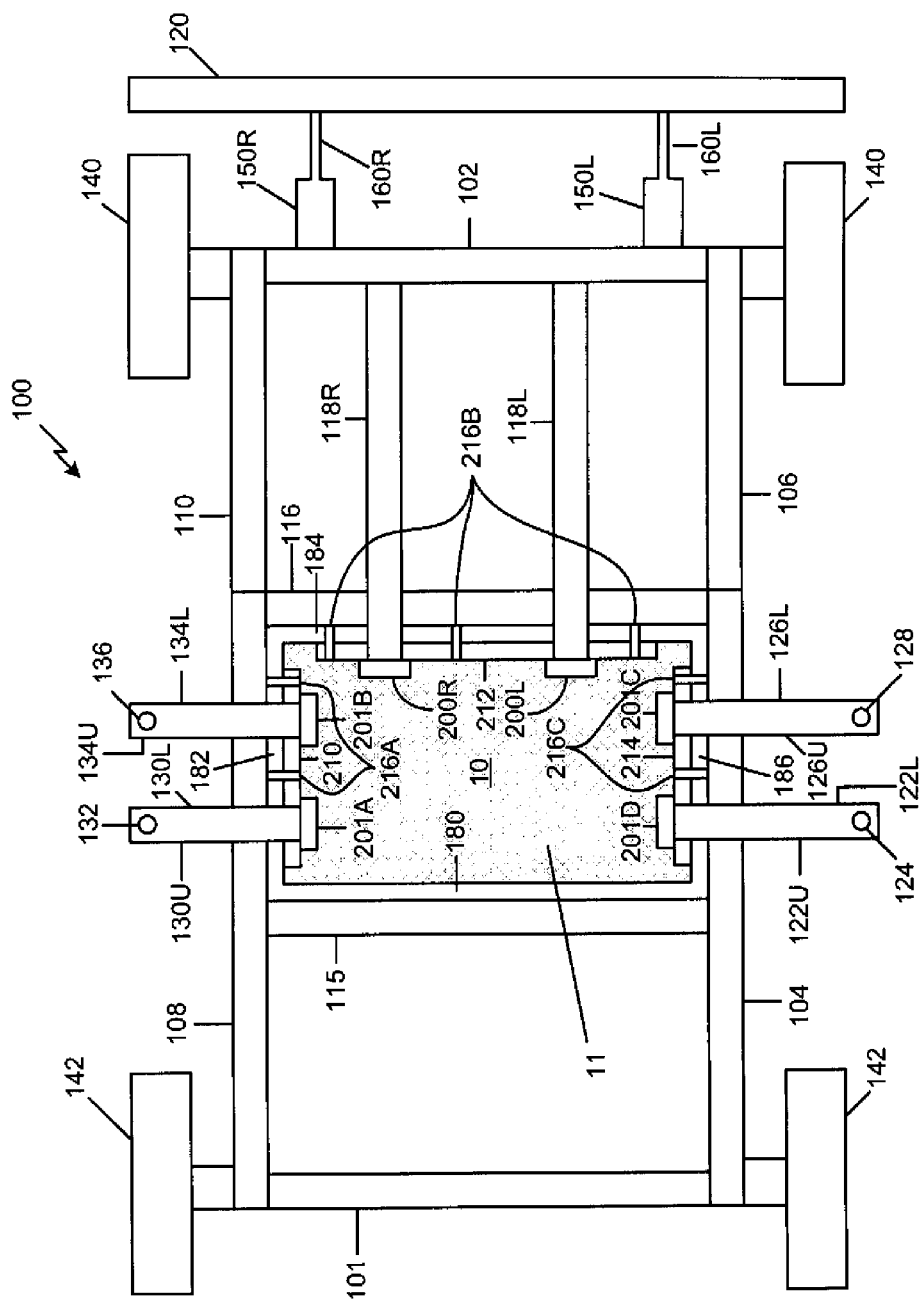
FIG. 2 is an illustration of a top view of the assembly of FIG. 1, in accordance with the first exemplary embodiment of the present invention.

The crumple box 10 is filled with an energy absorbing material (shown in FIG. 2). One example of this energy absorbing material is a product that bonds together sheets of aluminum foil and then expands them to form a cellular honeycomb configuration. The product is strong and lightweight and is known to those having ordinary skill in the art for use in energy absorption applications.

The crumple box 10 resides between the front cross beam 115, the right side rail 108, the rear cross beam 116, and the left side rail 104, and may be fixedly attached to all of them. The front side 180 of the energy absorbing container 10 may connect to the front cross beam 115 and the rear side 184 of the energy absorbing container 10 may connect to the rear cross beam 116. The right side 182 of the energy absorbing container 10 may connect to the right side rail 108. The left side 186 of the energy absorbing container 10 may connect to the left side rail 104.

An alternative form of automotive chassis to the assembly 100 shown in FIG. 1 is called a monocoque chassis. The monocoque does not have side rails. Monocoque is a one-piece structure which defines the overall shape of the car. The one-piece chassis is actually made by welding several pieces together. The floorpan, which is the largest piece, and other pieces are press-made by stamping machines. They are spot welded together by robot arms in a stream production line. After that, some accessories like doors, hood, trunk, and side panels and roof are added. The crumple box 10 can be attached to the bottom portions of a monocoque chassis and enjoy benefits of the present invention.

Two elongated members, a right rear shaft 118R and a left rear shaft 118L enter the rear side 184 of the crumple box 10. These shafts 118R, 118L are fixedly connected to the rear bumper beam 102.

There are four side bumpers, or posts, connected to the crumple box 10 in this exemplary embodiment. A left front side bumper 124 fixedly connects to a pair of elongated members, a left front upper shaft 122U and a left front lower shaft 122L, which both enter the left side 186 of the crumple box 10. A left rear side bumper 128 fixedly connects to a left upper shaft 126U and a left rear lower shaft 126L, which enter the left side 186 of the crumple box 10. A right front side bumper 132 is fixedly connected to a right front upper shaft 130U and a right front lower shaft 130L, which enter the right side 182 of the crumple box 10. A right rear side bumper 136 is fixedly connected to a right rear upper shaft 134U and a right rear lower shaft 134L, which enter the right side 182 of the crumple box 10. The vehicle wheels 140, 142 are illustrated for reference purposes.

Figure 11:
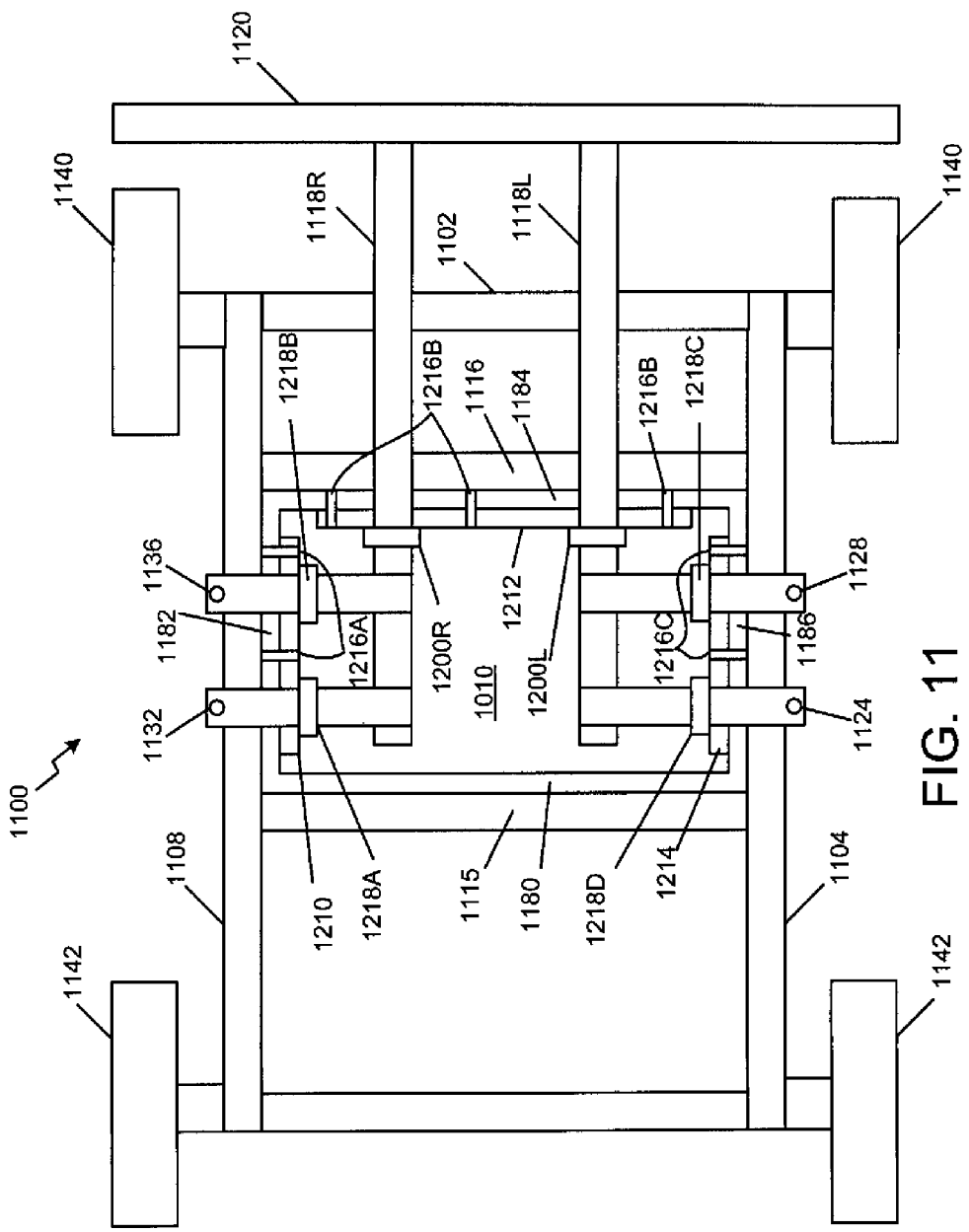
FIG. 11 is an illustration of a top view of the assembly shown in FIG. 9, in accordance with the second exemplary embodiment of the present invention.

In FIG. 11 the right rear shaft 118R and the left rear shaft 118L are fully extended (telescoped slidably) out of the crumple box rear side 184 (telescoping of the shafts 118R, 118L are explained further herein). The rear bumper beam 102 is in its most rearward position relative to the rest of the assembly 100. This position is the extended bumper mode form of the assembly 100. The side bumpers 124, 128, 132, and 136 are fully extended out of the crumple box 10 as well in FIG. 1 (and the telescoping of the side bumpers 124, 128, 132, and 136 will also be explained further herein). In FIG. 1 the crumple box top plate 113 must be designed to prevent the components inside the crumple box 10, or those retracting into the crumple box 10, from entering the passenger compartment of the vehicle 103 (shown in FIG. 5) during a collision.

FIG. 2 is an illustration of a top view of the assembly 100 of FIG. 1, in accordance with the first exemplary embodiment of the present invention. In this illustration, the top plate 113 of the crumple box 10 is omitted to show internal details of the crumple box 10, including energy absorbing material 11. The front side 180 of the crumple box 10 is fixedly attached to the front cross beam 115.

A right plate 210 is shown connected to the right side 182 of the crumple box 10 via breakable bolts 216A. The breakable bolts 216A (and others breakable bolts cited throughout this disclosure) may be any type of fastener that is designed to fail with a predetermined level of force, a level of force that is anticipated to be received. The breakable bolts 216A are positioned such that the crumple box 10 is not engaged when the level of force does not warrant use of the crumple box 10. Breakable bolts and other such breakable fasteners are known in some industries, for instance, as disclosed in U.S. Pat. No. 6,688,831 to Antonucci, et al.

A rear plate 212 is shown connected to the rear side 184 of the crumple box 10 via breakable bolts 216B. A left plate 214 is shown connected to the left side 186 of the crumple box 10 via breakable bolts 216C. The right rear shaft 118R passes through a rear hole in the rear cross beam 116, through a hole in the rear side 184 of the crumple box 10, and through a hole in the rear plate 212, where the right rear shaft 118R is moveably attached to a right rear control unit 200R. The left rear shaft 118L passes through a rear hole in the rear cross beam 116, through a hole in the rear side 184 of the crumple box 10, and through a hole in the rear plate 212, where the left rear shaft 118L is moveably attached to a left rear control unit 200L.

In FIG. 2, the left front upper shaft 122U and the left front lower shaft 122L (lower shafts 122L, 126L, 130L, 134L are more clearly seen in FIG. 1) pass over and under the left side rail 104 (more easily observable in FIG. 1) and pass through apertures or holes formed in the left side 186 of the crumple box 10 and in left plate 214 where the shafts 122U, 122L are movably attached to a left front side control unit 201D. The left rear upper shaft 126U and the left rear lower shaft 126L pass over and under the left side rail 104 and pass through holes formed in the left side 186 of the crumple box 10 and in the left plate 214, where the shafts 126U, 126L are movably attached to a left rear side control unit 201C.

The right front upper shaft 130U and the right front lower shaft 130L pass over and under the right side rail 108 and pass through apertures or holes formed in the right side 182 of the crumple box 10 and the right plate 210, where the shafts 130U, 134L are movably attached to a right front side control unit 201A. The right rear upper shaft 134U and the right rear lower shaft 134L pass over and under the right side rail 108 and pass through holes formed in the right side 182 of the crumple box 10 and the right plate 210, where the shafts 134U, 134L are movably attached to a right rear side control unit 201B.

As shown in FIG. 1 and FIG. 2 the rear bumper beam 102 and the rear tires 140 are extended rearwards by the extension of the right rear shaft 118R and the left rear shaft 118L from the crumple box 10. The side bumpers 124, 128, 132 and 136 are in their extended outward position. The vehicle is in a state of readiness to absorb the energy of a rear or side collision. The control units 200L, 200R cause the right rear shaft 118R and the left rear shaft 118L to move between a retracted position and an extended position. The shafts 118R, 118L can reside at any of a plurality of positions between fully extended and fully retracted.

The addition of side crumple zones to a vehicle allows the vehicle chassis to become lighter. A lighter vehicle will get better fuel economy. To protect a passenger from a side collision, the doors and door frames of a conventional vehicle must be made strong enough to prevent the intrusion of the colliding vehicle into the passenger compartment. With side bumpers attached to a large crumple zone, the doors and door frames can be made less strong and less heavy. The side bumpers 124, 128, 132 and 136 and crumple zone 10 take a portion of the task of absorbing and stopping the colliding vehicle in a side collision.

Figure 3A:
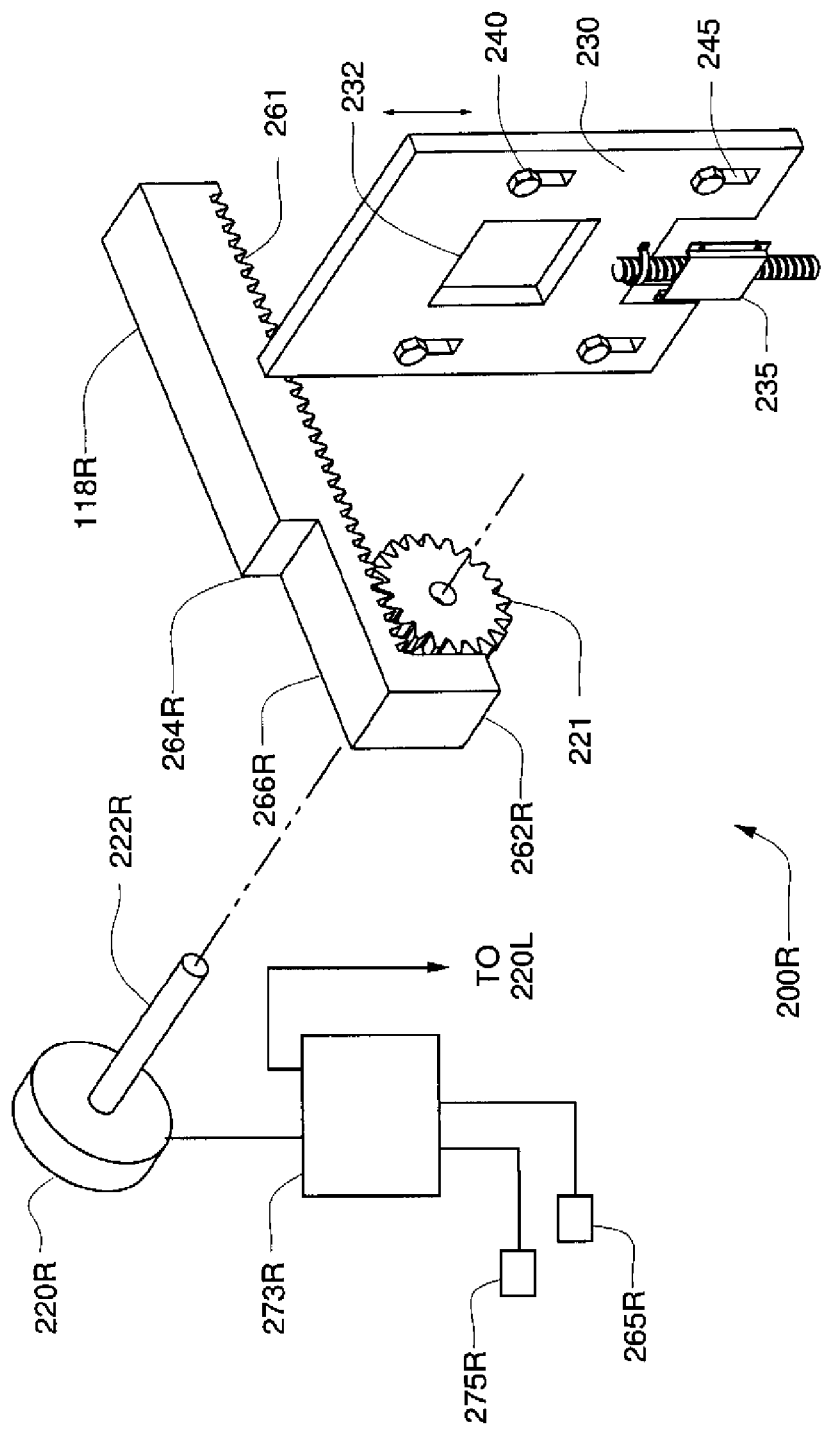
FIG. 3A is an illustration of an exploded perspective view of the right rear control unit shown in FIG. 2, in accordance with the first exemplary embodiment of the present invention.
Figure 3C:
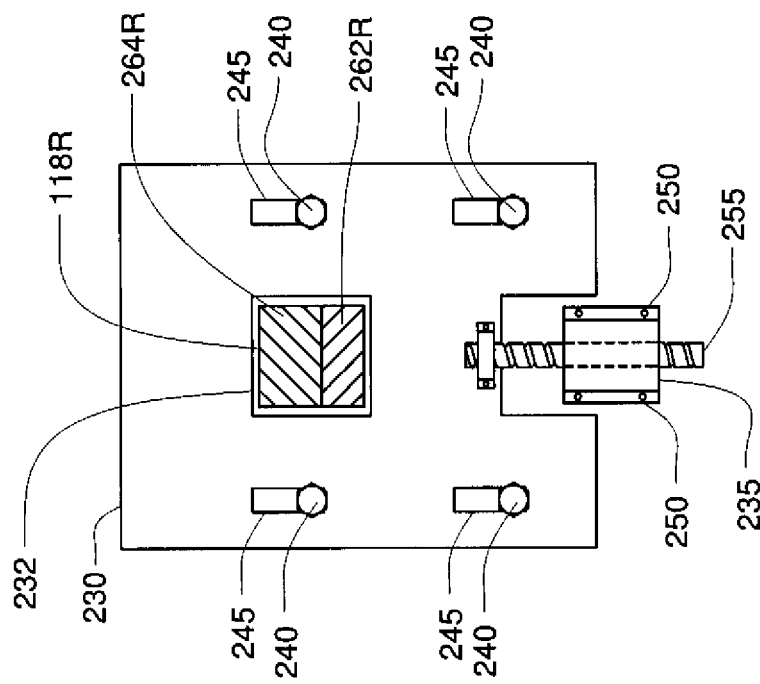
FIG. 3C is an illustration of a front view of the stop plate shown in FIG. 3A, in accordance with the first exemplary embodiment of the present invention.
Figure 3B:
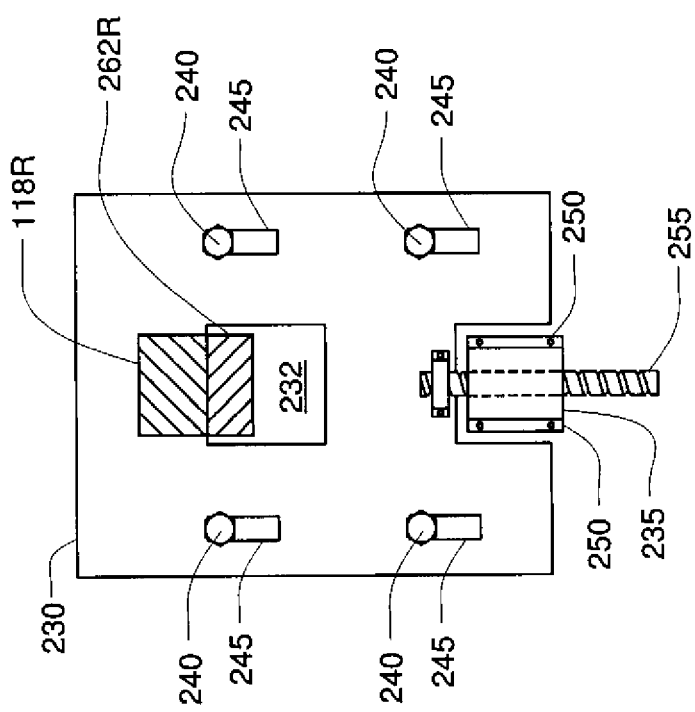
FIG. 3B is an illustration of a front view of the right rear control unit shown in FIG. 3A, in accordance with the first exemplary embodiment of the present invention.

FIG. 3A is an illustration of an exploded perspective view of the right rear control unit 200R shown in FIG. 2, in accordance with the first exemplary embodiment of the present invention. FIG. 3B is an illustration of a front view of a lock, or stop plate 230 shown in FIG. 3A, in accordance with the first exemplary embodiment of the present invention. FIG. 3C is an illustration of a front view of the stop plate 230 shown in FIG. 3A, in accordance with the first exemplary embodiment of the present invention. The right rear shaft 118R has a rack structure, which has gear teeth 261 that engage with a rear pinion gear 221. This gear arrangement is known in the industry as a rack and pinion. The rear pinion gear 221 is connected to a rear motor shaft 222R of a rear right motor unit 220R, which contains an electric motor. A vehicle operator can access a control to manipulate the rear right motor unit 220R that moves the right rear shaft 118R via the rear pinion gear 221 to extend or retract the rear bumper 120 (shown in FIG. 2).

A rear pressure sensor 275R may be placed on the rear bumper 120 (shown in FIG. 2). The rear pressure sensor 275R signals a rear motor control unit 273R if a rear bumper is pressing against an obstacle. A rear range detector 265R may also be placed at the rear of the vehicle. The rear range detector 265R signals the rear motor control unit 273R when an object is proximate to the rear bumper 120. In each case, a signal from the sensor 275R, 265R may cause the rear right motor control unit 273R to impede action of the rear right motor unit 220R. The rear motor control unit 273R may also be in communication with a rear left motor control unit 220L (referenced, but not fully illustrated in FIG. 3A). Fluid movement of the rear bumper 120 may include concerted rear motor controls 220L, 220R controlled by a single rear motor control unit 273R.

FIGS. 3A, 3B, and 3C illustrate one prospective system for allowing the rear bumper 120 to be extended and retracted while maintaining a connection to the crumple box 10. The system provides a shuttling mechanism for the rear bumper 120. The right rear shaft 118R includes a first face 262R, a second face 264R, and a shaft tip 266R connecting the faces 262R, 264R. The right rear shaft 118R traverses a stop plate 230, through a central slot 232 of the stop plate 230. The stop plate 230 is mounted to the rear plate 212 (shown in FIG. 2), in this exemplary embodiment, by four fasteners 240. The fasteners 240 sit within four peripheral plate slots 245 that allow the stop plate 230 to be slidably oriented to the rear plate 212. FIG. 3B shows the stop plate 230 slid into a lowered position and FIG. 3C shows the stop plate 230 slid into a raised position.

The stop plate 230 may be raised and lowered with a stop plate motor 235, which is fastened to the rear plate 212 by the stop plate motor bracket 250. The stop plate motor 235 is connected to the stop plate 230 by a stop plate shaft 255. The stop plate motor 235 raises and lowers the stop plate shaft 255, which is rigidly attached to the stop plate 230, raising and lowering the stop plate 230. For the stop plate 230 to be lowered, as shown in the exemplary embodiment of FIG. 3B, the right rear shaft 118R must be in an extended position such that the shaft tip 266R is contained within the central slot 232. The second face 264R is thereby blocked by the upper solid region of stop plate 230.

If the rear bumper 120 (shown in FIG. 1) is hit by another vehicle, the force of the hit is transmitted through the springs 160R, 160L (shown in FIG. 1) and the rear shafts 118R, 118L to the rear control units 200R, 200L. The stop plates 230 prevent motion of the rear shafts 118R, 118L relative to the rear plate 212. If the rear collision force is low, the breakable bolts 216B (shown in FIG. 2) will not break, and nothing will move inside the crumple box 10. The right rear bumper spring 160R and the left rear bumper spring 160L (shown in FIG. 1) will be compressed and absorb a predominant amount of the collision energy.

During a collision, the second face 264R will be propelled into a back surface of the stop plate 230, which will pull on the rear plate 212 with the fasteners 240. If the collision exerts sufficient force on the right rear shaft 118R that the breakable bolts 216B (shown in FIG. 2) break, the rear plate 212 will be propelled further into the crumple box 10 along with the stop plate 230 and other elements of the right rear control unit 200R.

Figure 4B:
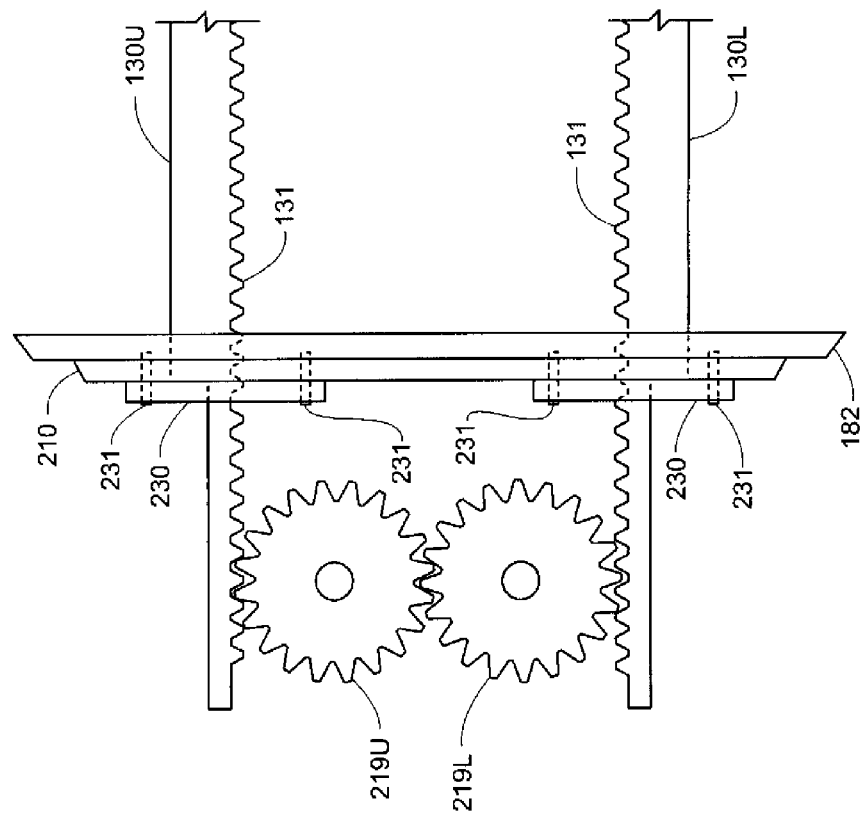
FIG. 4B is an illustration of a rear view of a portion of the assembly shown in FIG. 4A, in accordance with the first exemplary embodiment of the present invention.
Figure 4A:
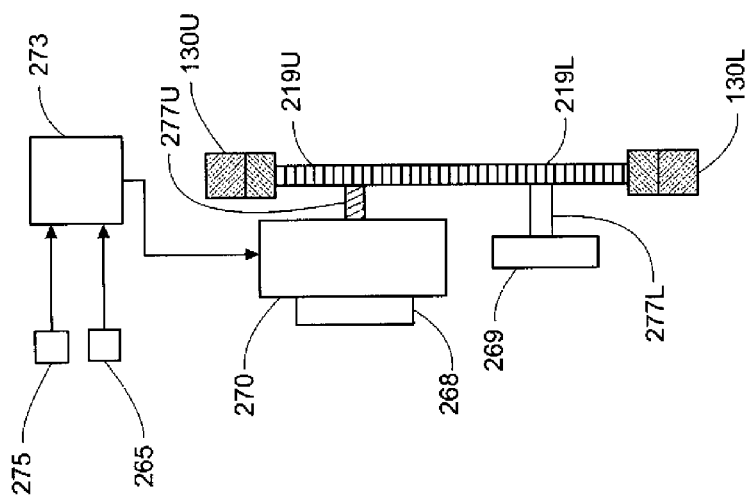
FIG. 4A is an illustration of a side view of a portion of the assembly shown in FIG. 2, in accordance with the first exemplary embodiment of the present invention.

FIG. 4A is an illustration of a side view of a portion of the assembly 100 shown in FIG. 2, in accordance with the first exemplary embodiment of the present invention. FIG. 4B is an illustration of a rear view of the portion of the assembly 100 shown in FIG. 4A, in accordance with the first exemplary embodiment of the present invention. The right front upper shaft 130U is shown to have a rack structure, including gear teeth 131, that engage with an upper side pinion gear 219U, and the right front lower shaft 130L is shown to have a rack structure, including gear teeth 131, that engage with a lower side pinion gear 219L.

The upper side pinion gear 219U is connected to a side motor unit 270 and a side motor unit bracket 268 by an upper side shaft 277U. The lower side pinion gear 219L is mounted to a pinion gear bracket 269 by a lower side shaft 277L. The side motor unit 270, through the upper side shaft 277U, initiates rotational movement of the upper side pinion gear 219U. The lower side pinion gear 219L, by virtue of its engagement with the upper side pinion gear 219U, is urged to move rotationally when the upper side pinion gear 219U rotates. In this manner, the right front upper shaft 130U and the right front lower shaft 130L are caused to move relatively in unison.

A side pressure sensor 275 may be placed on each of the side bumpers 124, 128, 132 and 136 (shown in FIG. 2). The side pressure sensor 275 signals a side motor control unit 273 if a side bumper 124, 128, 132 and 136 is pressing against an obstacle. A side range detector 265 may also be placed on each side of the vehicle. The side range detector 265 signals the side motor control unit 273 when an object is proximate to the side bumpers 124, 128, 132 and 136. In each case, a signal from the sensor 275, 265 may cause the side motor control unit 273 to impede action of the side motor unit 270.

FIG. 4B shows the right front shafts 130L, 130U traversing openings in the stop plates 230, the right plate 210, and the right side 182 of the crumple box 10. The stop plates 230 connect to the right plate 210 with stop plate bolts 231. The stop plates 230 connect to the right plate 210 in a manner similar to the connection of the stop plates 230 to the rear plate 212 (as shown in FIGS. 3A-3C), thus allowing the stop plates 230 to slide relative to the right plate 210.

When, for instance, the right front side bumper 132 is hit by another vehicle, the collision force is at least partially transmitted through the side bumper shafts 130U, 130L which transmits the force to the side control unit 201A. The side bumper shafts 130U, 130L cannot move relative to the side control unit 201A because the stop plates 230 are impeding the motion of the side bumper shafts 130U, 130L. If the side collision force is strong, the breakable bolts 216A (shown in FIG. 2) will break and allow the right plate 210 to be pushed into the crumple box 10. The right plate 210 moves like a piston through the crumple box 10 toward the other side of the crumple box 10. As it moves, the right plate 210 will compress the energy absorbing material and a material portion of side collision energy will be absorbed.

If the side collision force is low, the breakable bolts 216A will not break, and nothing will move inside the crumple box 10. The breakable bolts 216A are used to prevent unnecessary compression to the crumple box 10 energy absorbing material in a low energy collision.

The expansion of the rear and side shafts may be only a portion of their maximum travel. The shafts can move any distance between fully retracted and fully extended. The stop plates 230 may slide up into the gear teeth 131, 261 to engage the side and rear plates 210, 214, 212 with the respective side and rear shafts 122U, 122L, 126U, 126L, 130U, 130L, 134U, 134L, 118L, 118R. However, maximum safety through the presently disclosed design will be realized by the stop plate 230 sliding down in front of a face of the shafts 130U, 130L.

Figure 5:
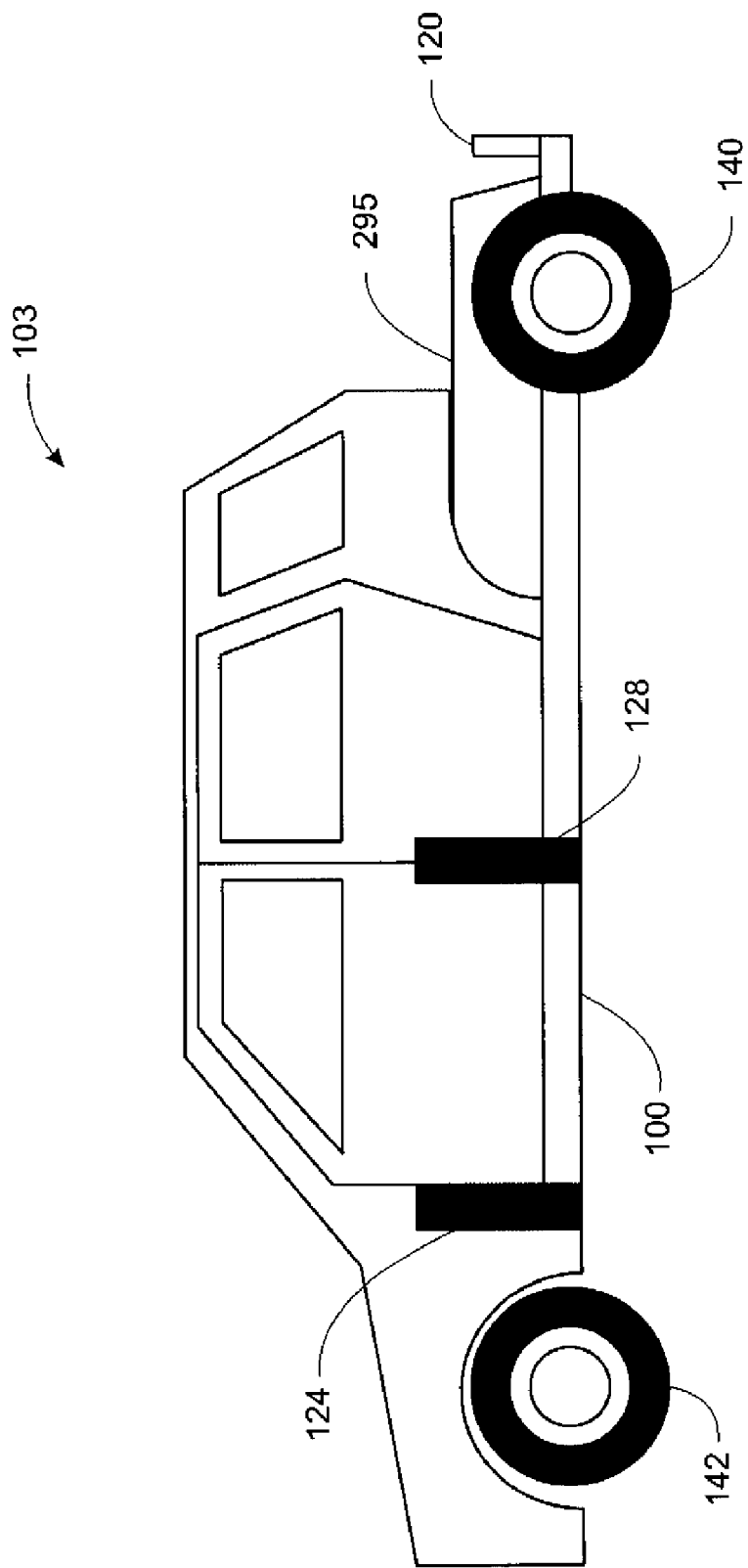
FIG. 5 is a side view of a vehicle in an extended bumper mode, in accordance with the first exemplary embodiment of the present invention.

FIG. 5 is a side view of a vehicle 103 in an extended bumper mode, in accordance with the first exemplary embodiment of the present invention. A body panel 295 assists other drivers in seeing the extended rear bumper 120. The body panel 295 may fold down or otherwise be received within the vehicle 103 when the vehicle 103 is in a retracted bumper mode. A short wheelbase vehicle gives a choppier ride than a long wheelbase vehicle. When it is in its long wheelbase mode, as in FIG. 5, the vehicle 103 provides a better ride on highways and provides more protection from rear collisions. When the rear wheels 140 are extending backwards, steps should be taken to insure that the wheels 140 can rotate. The front brakes should be engaged to prevent the vehicle 103 from rolling. The vehicle 103 should be in park or neutral. These functions can be controlled by microprocessors. Also, electrical and hydraulic connections to elements extendable with the rear bumper 120 will need to be constructed with adequate extension or slack capability to maintain connections in both retracted and extended bumper modes.

Figure 6:
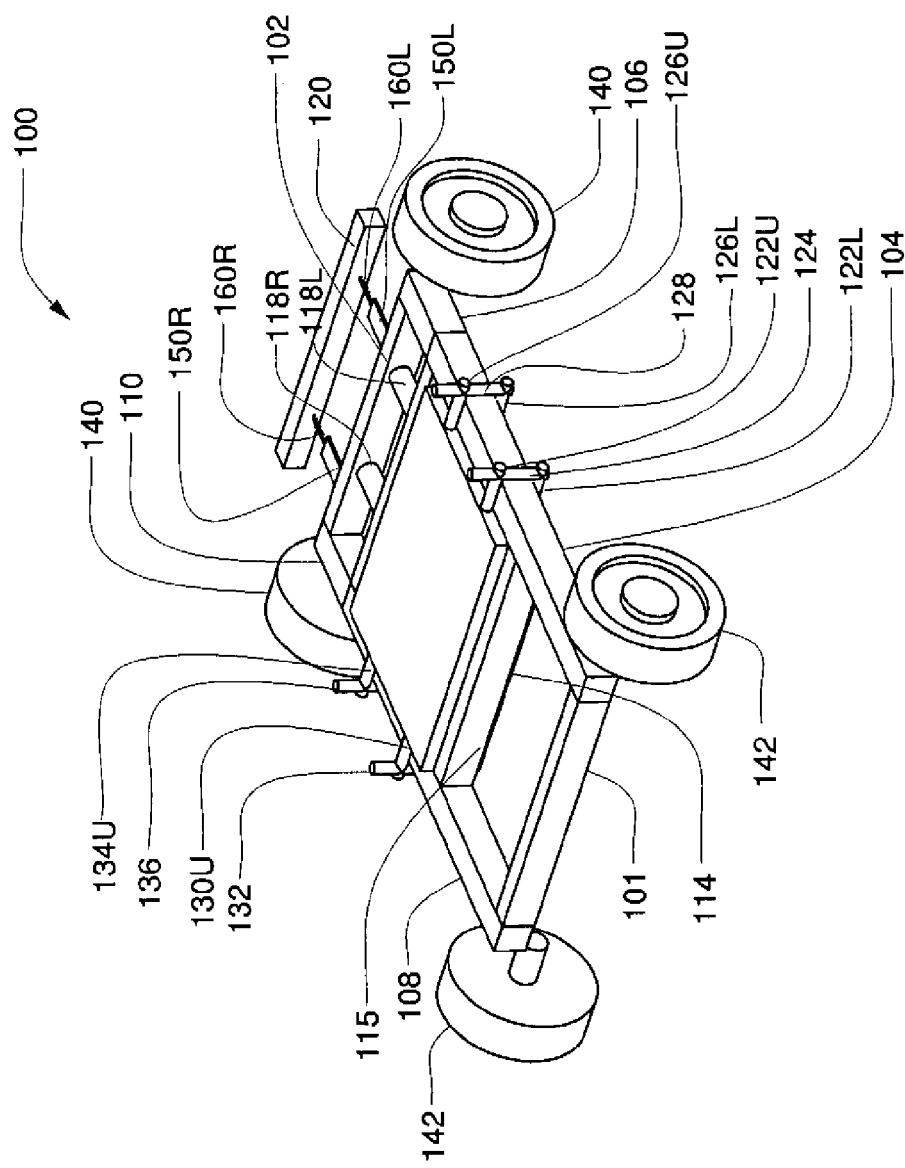
FIG. 6 shows a perspective view of the assembly of FIG. 1 with its bumpers in the retracted bumper mode, in accordance with the first exemplary embodiment of the present invention.

FIG. 6 shows a perspective view of the assembly 100 of FIG. 1 with its bumpers 120, 124, 128, 132, 136 in the retracted bumper mode, in accordance with the first exemplary embodiment of the present invention. The right moveable side rail 110 is shown retracted into right side rail 108. The left moveable side rail 106 is shown retracted into left side rail 104. The right rear shaft 118R and left rear shaft 118L are shown retracted into the crumple box 10. The shafts for the left front side bumper 124, the left rear side bumper 128, the right front side bumper 132, and the right rear side bumper 136 are shown retracted into the crumple box 10.

In this illustration of the first exemplary embodiment, the rear wheels 140 also have moved towards the front of the assembly 100 along with the rear bumper beam 102 and rear bumper 120.

Figure 7:
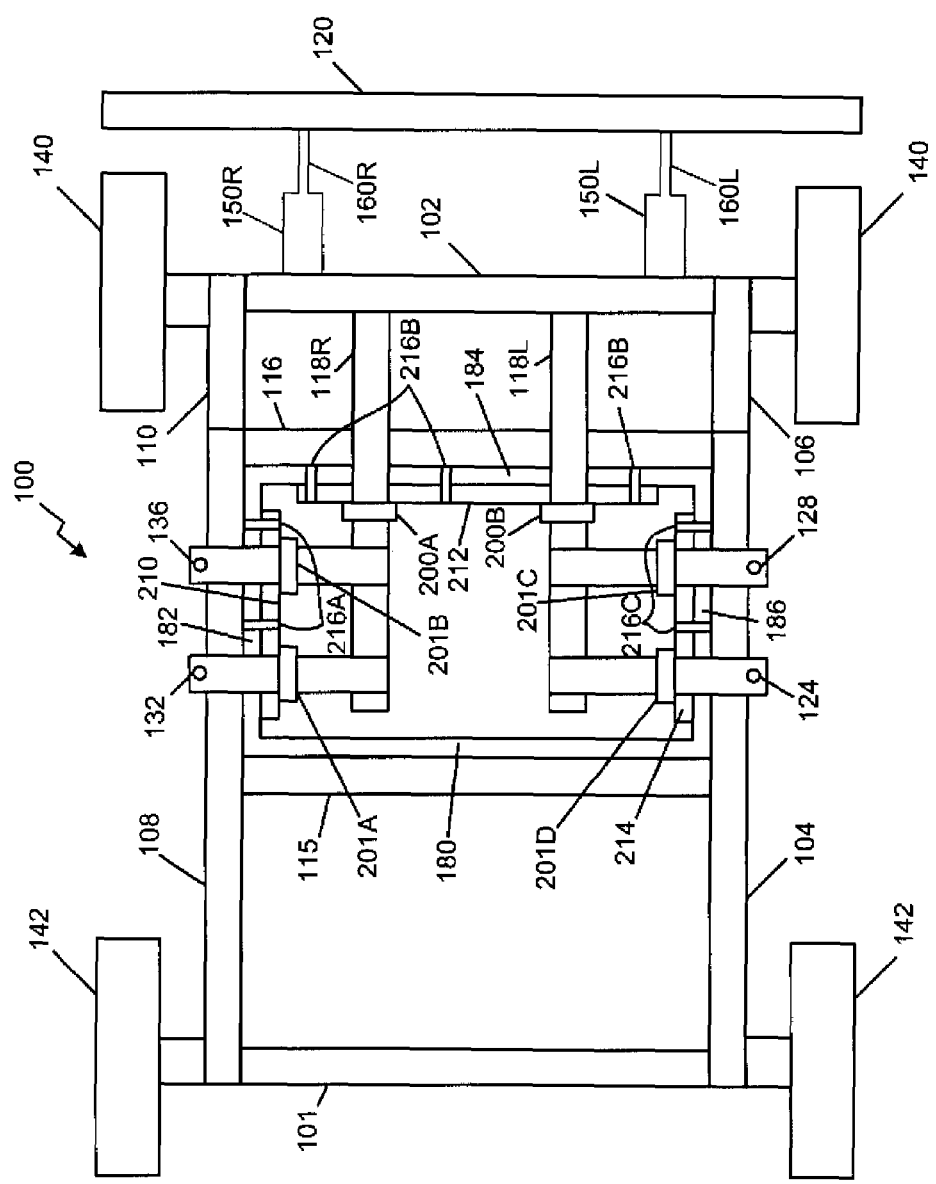
FIG. 7 is a top view of the assembly shown in FIG. 6, in accordance with the first exemplary embodiment of the present invention.

FIG. 7 is a top view of the assembly 100, shown in FIG. 6, in accordance with the first exemplary embodiment of the present invention. Top plate 113 of the crumple box 10 is removed from the FIG. 7 view to show internal details of the crumple box 10. The right moveable side rail 110 is shown substantially retracted into right side rail 108. The left moveable side rail 106 is shown substantially retracted into left side rail 104. The right rear shaft 118R and the left rear shaft 118L are shown substantially retracted into the crumple box 10. The shafts for the left front side bumper 124, the left rear side bumper 128, the right front side bumper 132, and the right rear side bumper 136 are shown substantially retracted into the crumple box 10. Otherwise, the elements shown in FIG. 7 are as they appear in FIG. 2.

Figure 8:
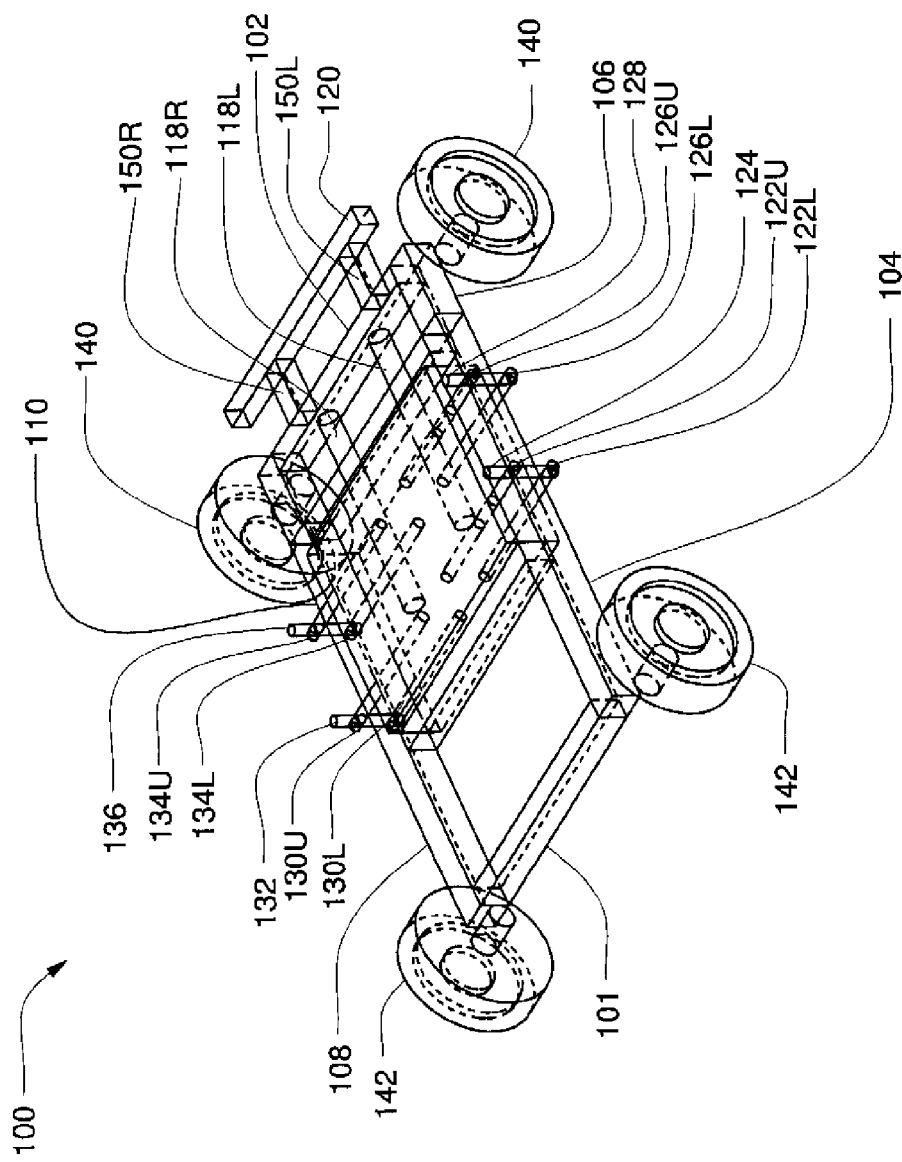
FIG. 8 is a perspective view of the assembly shown in FIG. 7, in accordance with the first exemplary embodiment of the present invention.

FIG. 8 is a perspective view of the assembly 100 shown in FIG. 7, in accordance with the first exemplary embodiment of the present invention. The right rear shaft 118R and left rear shaft 118L are shown substantially retracted into the crumple box 10. The shafts for the left front side bumper 124, the left rear side bumper 128, the right front side bumper 132, and the right rear side bumper 136 are shown substantially retracted into the crumple box 10. The right rear shaft 118R and left rear shaft 118L pass between the upper and lower shafts 122U, 122L, 126U, 126L, 130U, 130L, 134U, 134L.

Figure 9:
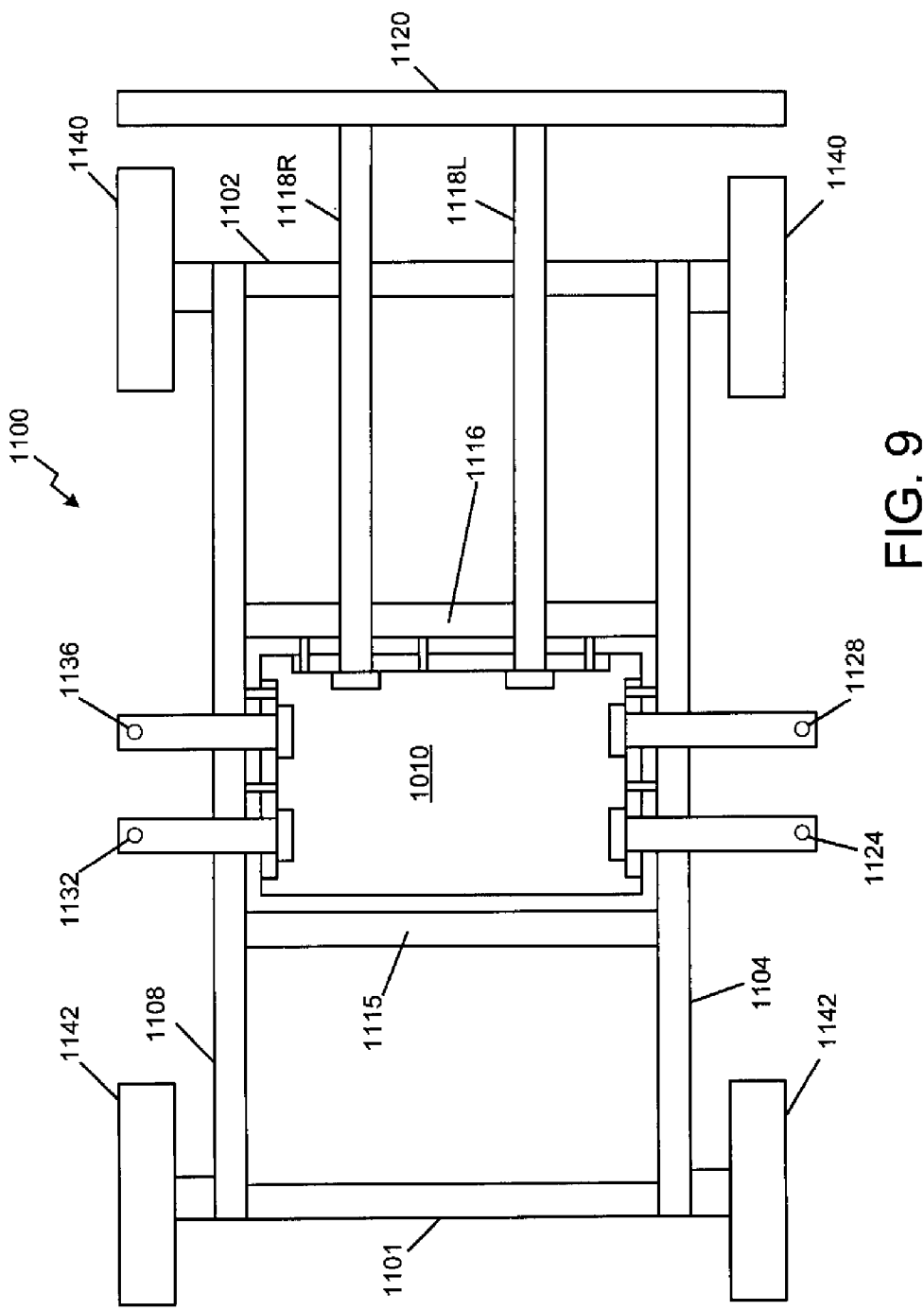
FIG. 9 is an illustration of a perspective view of an assembly, in accordance with a second exemplary embodiment of the present invention.

FIG. 9 is an illustration of a perspective view of an assembly 1100, in accordance with a second exemplary embodiment of the present invention. The left full side rail 1104 occupies an entire left side of the assembly 1100. There is no slidable action along the left full side rail 1104 unlike its counterpart in the first exemplary embodiment. The right full side rail 1108 occupies an entire right side of the assembly 1100. Rear shafts 1118L and 1118R pass through openings formed in a rear bumper beam 1102 and connect to a rear bumper 1120. The rear bumper beam 1102 is immobile relative to side rails 1104, 1108. The rear shafts 1118R, 1118L may be retracted into or extended out of a crumple box 1010. In the illustration of FIG. 9, the rear shafts 1118L and 1118R are substantially extended out the crumple box 1010. Also, side bumpers 1124, 1128, 1132, 1136 are substantially extended out of the crumple box 1010.

A front cross beam 1115 and a rear cross beam 1116 may be located between and approximately parallel to the front bumper beam 1101 and the rear bumper beam 1102. The front cross beam 1115 and the rear cross beam 1116 may connect to both the right side rail 1108 and the left side rail 1104. The vehicle wheels 1140, 1142 are illustrated for reference purposes.

Figure 10:
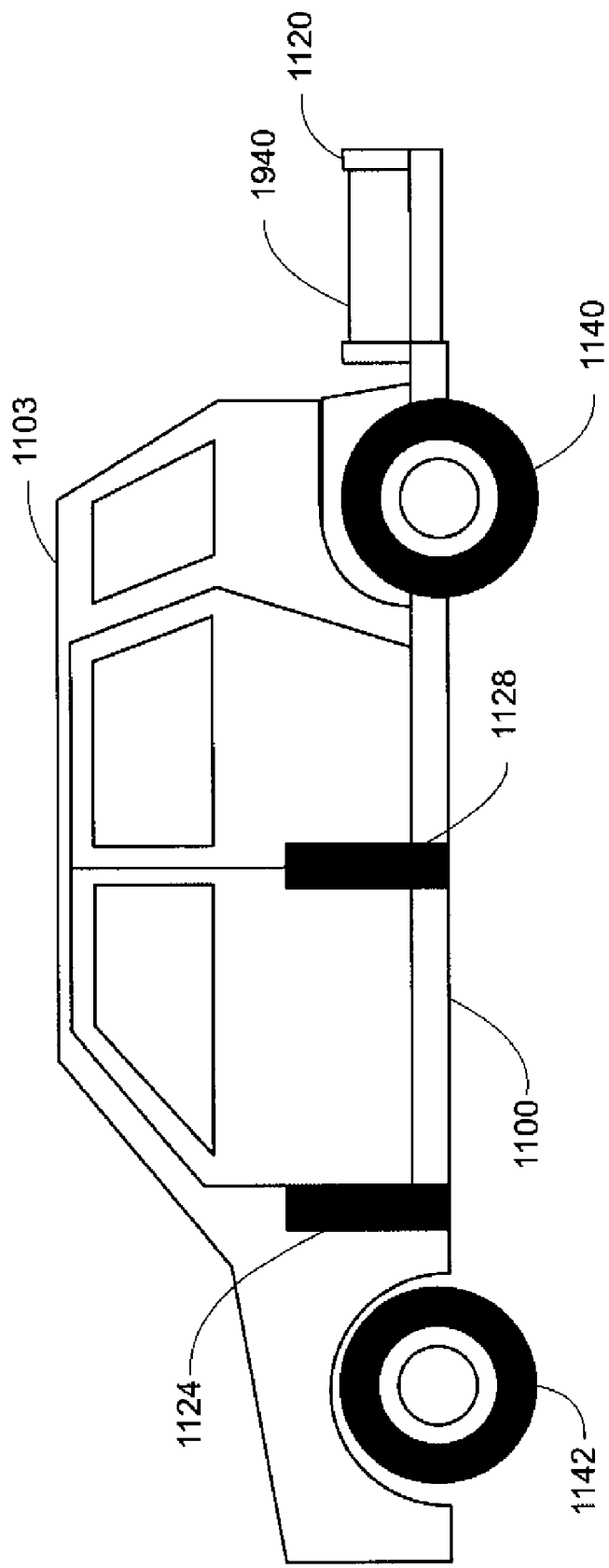
FIG. 10 is an illustration of a side view of a vehicle built with the assembly of FIG. 9, in accordance with the second exemplary embodiment of the present invention.

FIG. 10 is an illustration of a side view of a vehicle 1103 built with the assembly 1100 of FIG. 9, in accordance with the second exemplary embodiment of the present invention. FIG. 10 shows a side view of the vehicle 1103 in an extended bumper mode. A rear body panel 1940 assists other drivers in seeing the extended rear bumper 1120. The body panel 1940 might be a spring loaded roll of plastic which can expand and retract into a cavity.

FIG. 11 is an illustration of a top view of the assembly 1100 shown in FIG. 9, in accordance with the second exemplary embodiment of the present invention. FIG. 11 shows the rear shafts 1118L and 1118R retracted into the crumple box 1010. The side bumpers 1124, 1128, 1132 and 1136 are also shown retracted into the crumple box 1010.

The crumple box 1010 may be a hollow rectangular box, container, or rectangular prism, with a front side 1180, a right side 1182, a left side 1186, and a rear side 1184. The crumple box 1010 may also include a bottom plate and a top plate. The crumple box 1010 may be filled with an energy absorbing material. One example of this energy absorbing material is a product that bonds together sheets of aluminum foil and then expands them to form a cellular honeycomb configuration. The product is strong and lightweight and is known to those having ordinary skill in the art for use in energy absorption applications.

The crumple box 1010 resides between the front cross beam 1115, the right side rail 1108, the rear cross beam 1116, and the left side rail 1104, and may be fixedly attached to all of them. The front side 1180 of the crumple box 1010 may connect to the front cross beam 1115 and the rear side 1184 of the crumple box 1010 may connect to the rear cross beam 1116. The right side 1182 of the crumple box 1010 may connect to the right side rail 1108. The left side 1186 of the crumple box 1010 may connect to the left side rail 1104.

A right plate 1210 is shown connected to the right side 1182 of the crumple box 1010 via breakable bolts 1216A. A rear plate 1212 is shown connected to the rear side 1184 of the crumple box 1010 via breakable bolts 1216B. A left plate 1214 is shown connected to the left side 1186 of the crumple box 1010 via breakable bolts 1216C. The right rear shaft 1118R passes through an opening in the rear bumper beam 1102, through a hole in the rear cross beam 1116, through a hole in the rear side 1184 of the crumple box 1010, and through a hole in the rear plate 1212, where the right rear shaft 1118R is moveably attached to a right rear control unit 1200R. The left rear shaft 1118L passes through an opening in the rear bumper beam 1102, through a hole in the rear cross beam 1116, through a hole in the rear side 1184 of the crumple box 1010, and through a hole in the rear plate 1212, where the left rear shaft 1118L is moveably attached to a left rear control unit 1200L.

In FIG. 11, the left front bumper 1124 passes about the left side rail 1104 (not unlike the relationship shown in FIG. 8) and pass through apertures or holes formed in the left side 1186 of the crumple box 1010 and in left plate 1214 where the left front bumper 1124 is movably attached to a left front side control unit 1218D. The left rear bumper 1128 passes about the left side rail 1104 and through holes formed in the left side 1186 of the crumple box 1010 and in the left plate 1214, where the left rear bumper 1128 is movably attached to a left rear side control unit 1218C.

The right front bumper 1132 passes through the right side rail 1108 and through apertures formed in the right side 1182 of the crumple box 1010 and the right plate 1210, where right front bumper 1132 is movably attached to a right front side control unit 1218A. The right rear bumper 1136 passes through the right side rail 1108 and through apertures formed in the right side 1182 of the crumple box 1010 and the right plate 1210, where the right rear bumper 1136 is movably attached to a right rear side control unit 1218B.

As shown in FIGS. 9-11 the rear bumper 1120, but not the rear tires 1140, is extendable rearwards by the extension of the rear shafts 1118R, 1118L from the crumple box 1010. The side bumpers 1124, 1128, 1132 and 1136 are similarly extendable. The vehicle is in a state of readiness to absorb the energy of a side or rear collision when the bumpers are in an extended position. The rear control units 1200L, 1200R cause the rear shafts 1118R, 1118L to move from between a retracted position to an extended position and any position therebetween.

The addition of side crumple zones to a vehicle allows the vehicle chassis to become lighter. A lighter vehicle will get better fuel economy. To protect a passenger from a side collision, the doors and doorframes of a conventional vehicle must be made strong enough to prevent the intrusion of the colliding vehicle into the passenger compartment. With side bumpers attached to a large crumple zone, the doors and doorframes can be made less strong and less heavy. The side bumpers 1124, 1128, 1132, 1136 and crumple zone 1010 undertake a portion of the task of absorbing and stopping the colliding vehicle.

Figure 12:
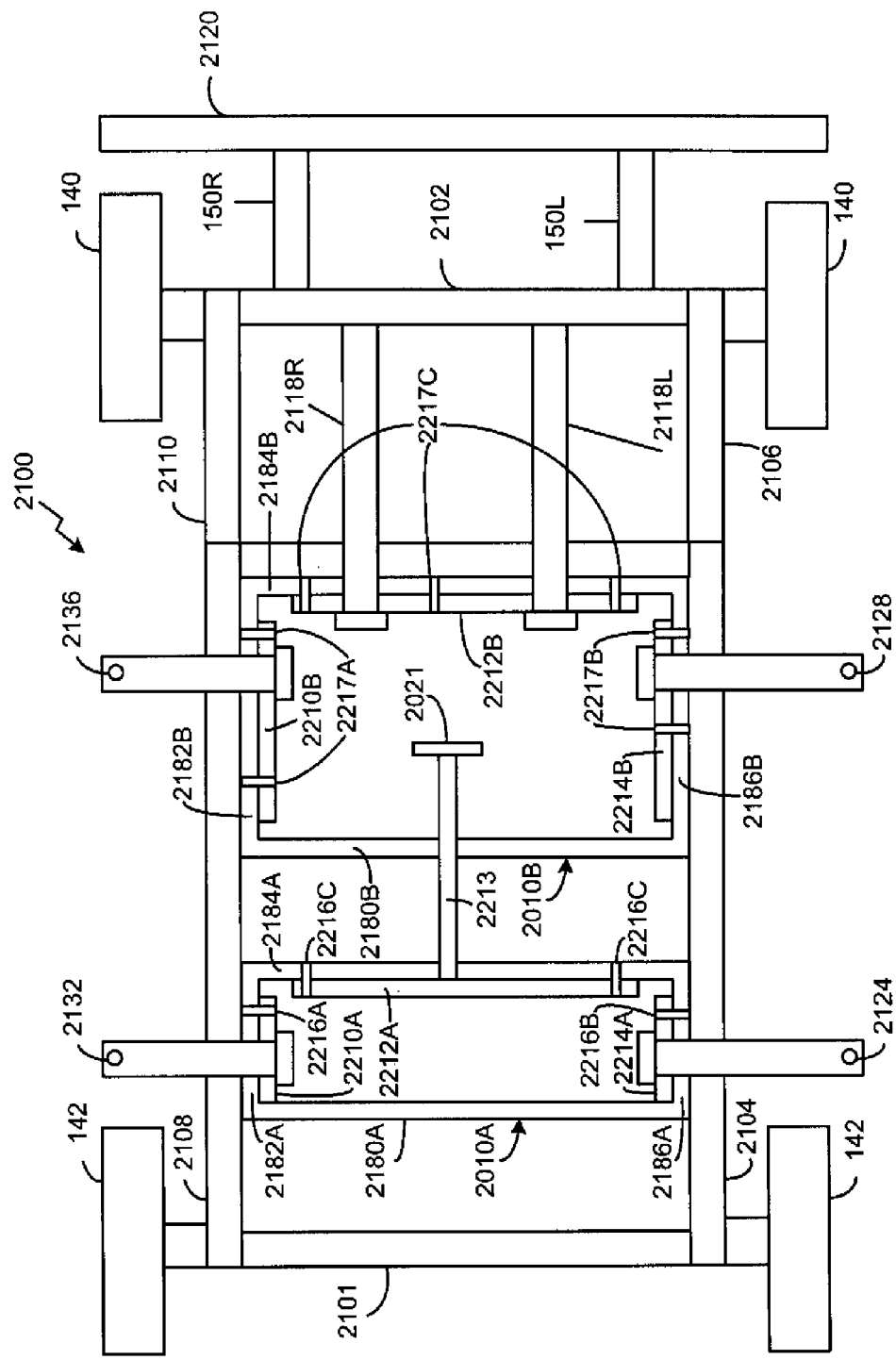
FIG. 12 is an illustration of a top view of an assembly, in accordance with a third exemplary embodiment of the present invention.

FIG. 12 is a top view of an assembly 2100, in accordance with a third exemplary embodiment of the present invention. The assembly 2100 is shown in an extended mode in FIG. 12, wherein a rear bumper 2120 is slidably moved to its rearmost position. A plurality of side bumpers 2124, 2128, 2132, 2136 are similarly in their extended position.

A proximal end of a front bumper beam 2101 is connected to a left side rail 2104, which is connected slidably to a left movable side rail 2106. A distal end of the front bumper beam 2101 is connected to a right side rail 2108, which is connected slidably to a right movable side rail 2110. A distal end of a rear bumper beam 2102 is connected to the right movable side rail 2110 and a proximal end of the rear bumper beam 2102 is connected to the left moveable side rail 2106.

The third exemplary embodiment includes two crumple boxes, a front crumple box 2010A and a rear crumple box 2010B. As shown, the front crumple box 2010A may be shorter in a front to rear direction than the rear crumple box 2010B. The front crumple box 2010A has a front side 2180A, a right side 2182A, a rear side 2184A, and a left side 2186A. A right plate 2210A and a left plate 2214A are attached to the right side 2182A and the left side 2186A by breakable bolts 2216A, 2216B. The front crumple box 2010A has a rear plate 2212A, which is attached to the rear side 2184A by breakable bolts 2216C. The rear plate 2212A is attached to an extensional member extensional member 2213 that passes through a hole formed in the rear side 2184A of the front crumple box 2010A. The rear crumple box 2010B has a front side 2180B, a right side 2182B, a rear side 2184B, and a left side 2186B. The rear crumple box 2010B has a right plate 2210B and a left plate 2214B which are attached to the right side 2182B and the left side 2186B by breakable bolts 2217A, 2217B. The rear crumple box 2010B also has a rear plate 2212B, which is attached to the rear side 2184B by breakable bolts 2217C and is connected to two rear shafts 2118R, 2118L. The extensional member 2213 passes through a hole formed in the front side 2180B of the rear crumple box 2010B and terminates inside the rear crumple box 2010B with a termination plate 2021.

If the rear bumper 2120 is hit with a large force by another vehicle, force applied through the rear shafts 2118R, 2118L will break the breakable bolts 2217C and will force the rear plate 2212B to move forward, traversing the rear crumple box 2010B. The extensional member 2213 is provided to connect the front crumple box 2010A to the rear crumple box 2010B so that both can cooperate to absorb the collision energy. A gap is provided between the termination plate 2021 and the rear plate 2212B. Since the rear crumple box 2010B is larger in this exemplary embodiment, the rear plate 2212B will travel some distance before it hits the termination plate 2021. The rear plate 2212B then pushes the termination plate 2021, which pushes on the extensional member 2213, which then pushes on the rear plate 2212A in the front crumple box 2010A. Thus, both crumple boxes 2010A, 2010B may cooperate to diminish the force realized by the passengers in a rear collision.

The rear crumple box 2010B and the front crumple box 2010A may have the same front to rear dimension without departing from the scope of the present invention. If the crumple boxes 2010A, 2010B have the same dimensions, there may be no gap between the termination plate 2021 and the rear plate 2212B, which may allow the termination plate 2021 and the rear plate 2212B to be connected or may allow the extensional member 2213 to terminate with the rear plate 2212B on the rear crumple box 2010B. If there is no gap between the termination plate 2021 and the rear plate 2212B, both the rear plates 2212A, 2212B may be acted upon at the same time by the forces on the rear shafts 2118R, 2218L. If the rear bumper 2120 is hit with a minor force from another vehicle, the breakable bolts 2216C, 2217C will not break and nothing will move inside either crumple box 2010A, 2010B and thus the energy absorbing material inside the crumple boxes 2010A, 2010B will not be damaged.

If the side bumpers 2124, 2128, 2132, 2136 are hit by a strong collision, the breakable bolts 2216A, 2216B, 2217A, 2217B will break and allow the side plates 2210A, 2210B, 2214A, 2214B to move, as pistons, towards the center of the vehicle while compressing the energy absorbing material in the crumple boxes 2010A, 2010B. While the side bumpers 2124, 2128, 2132, 2136 are discussed collectively, a side impact may affect only some or one of the bumpers 2124, 2128, 2132, 2136 and will likely not affect all four, thus only moving the side plates 2210A, 2210B, 2214A, 2214B attached to the affected bumpers 2124, 2128, 2132, 2136. If the side bumpers 2124, 2128, 2132, 2136 are hit by a minor force, the breakable bolts 2216A, 2216B, 2217A, 2217B will not break and the side plates 2210A, 2210B, 2214A, 2214B will not move and the energy absorbing material in the crumple boxes 2010A, 2010B will not be compressed and damaged.

The plates 2210A, 2210B, 2212A, 2212B, 2214A, 2214B may be of any size or dimension that would effectively allow the energy absorbing material in the crumple box 2010A, 2010B to diminish the force of a collision on the passengers. The plates 2210A 2210B, 2212A, 2212B, 2214A, 2214B should be thick enough and made from a sufficiently resilient material to avoid detrimental deformation in the event of a collision. Similarly, termination plate 2021 should be constructed such that it can sufficiently translate forces from the rear plate 2212B in the rear crumple box 2010B to the rear plate 2212A in the front crumple box 2010A, as well as avoiding detrimentally damaging the rear plate 2212B in the rear crumple box 2010B in the event of a collision. Here, detrimental damage is defined as inhibiting the part from functioning for its immediate intended purpose.

Figure 13:
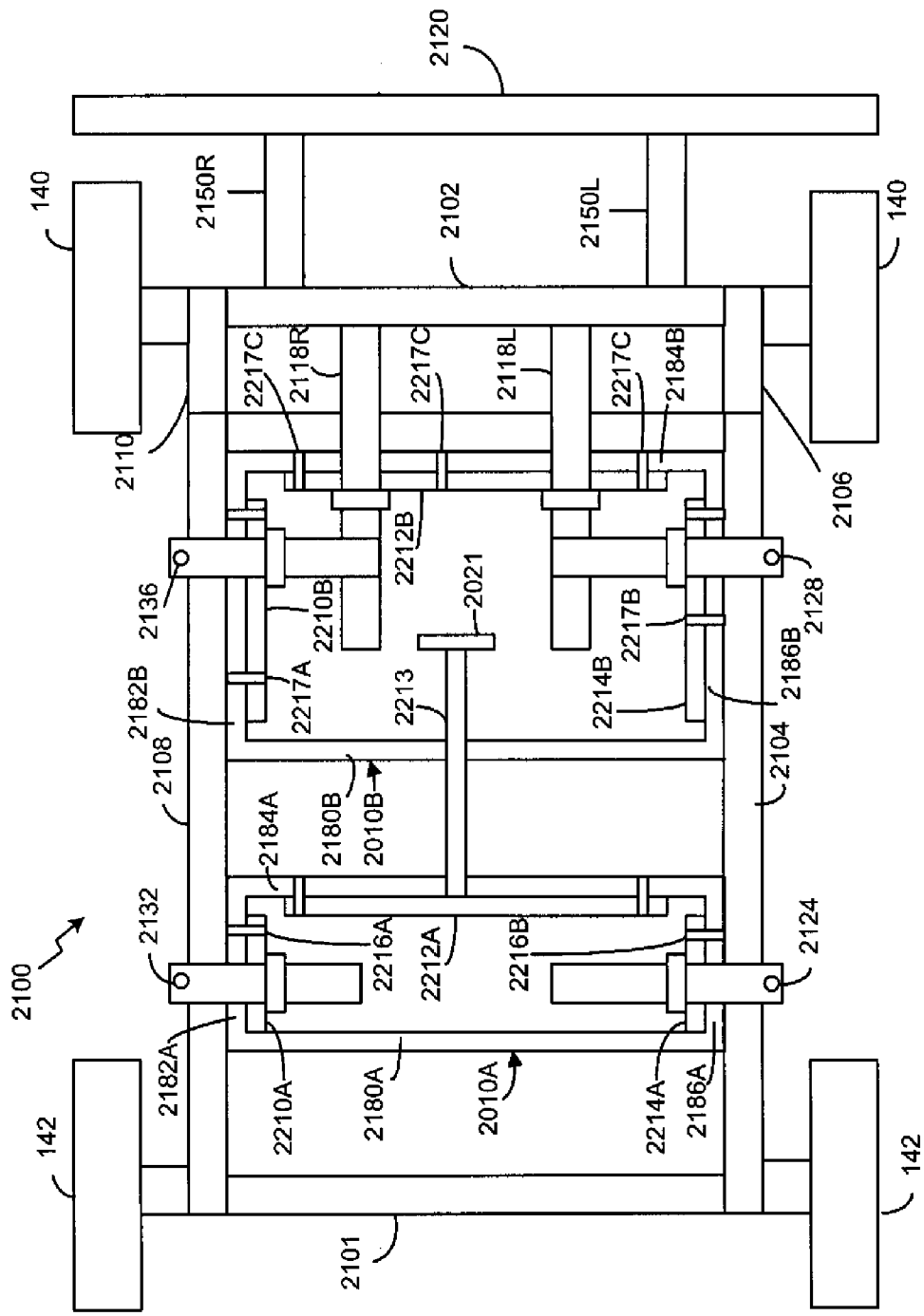
FIG. 13 is a top view of the assembly shown in FIG. 12, in accordance with the third exemplary embodiment of the present invention.

FIG. 13 is a top view of the assembly 2100 shown in FIG. 12, in accordance with the third exemplary embodiment of the present invention. FIG. 13 shows the assembly 2100 in a retracted mode, where the rear bumper 2120 is slidably moved to its front most position. The side bumpers 2124, 2128, 2132, 2136 are in their retracted position. The gap between the two crumple boxes 2010A, 2010B provides a space that allows the crumple box to avoid interfering with leg room for back seat passengers.

Also, one having ordinary skill in the art will appreciate, in comparing the second exemplary embodiment and the third exemplary embodiment, that a two crumple zone system can be designed in which the bumper is extendable (as discussed in the second exemplary embodiment) without making the wheelbase extendable (a provision of the third exemplary embodiment).

Figure 14:
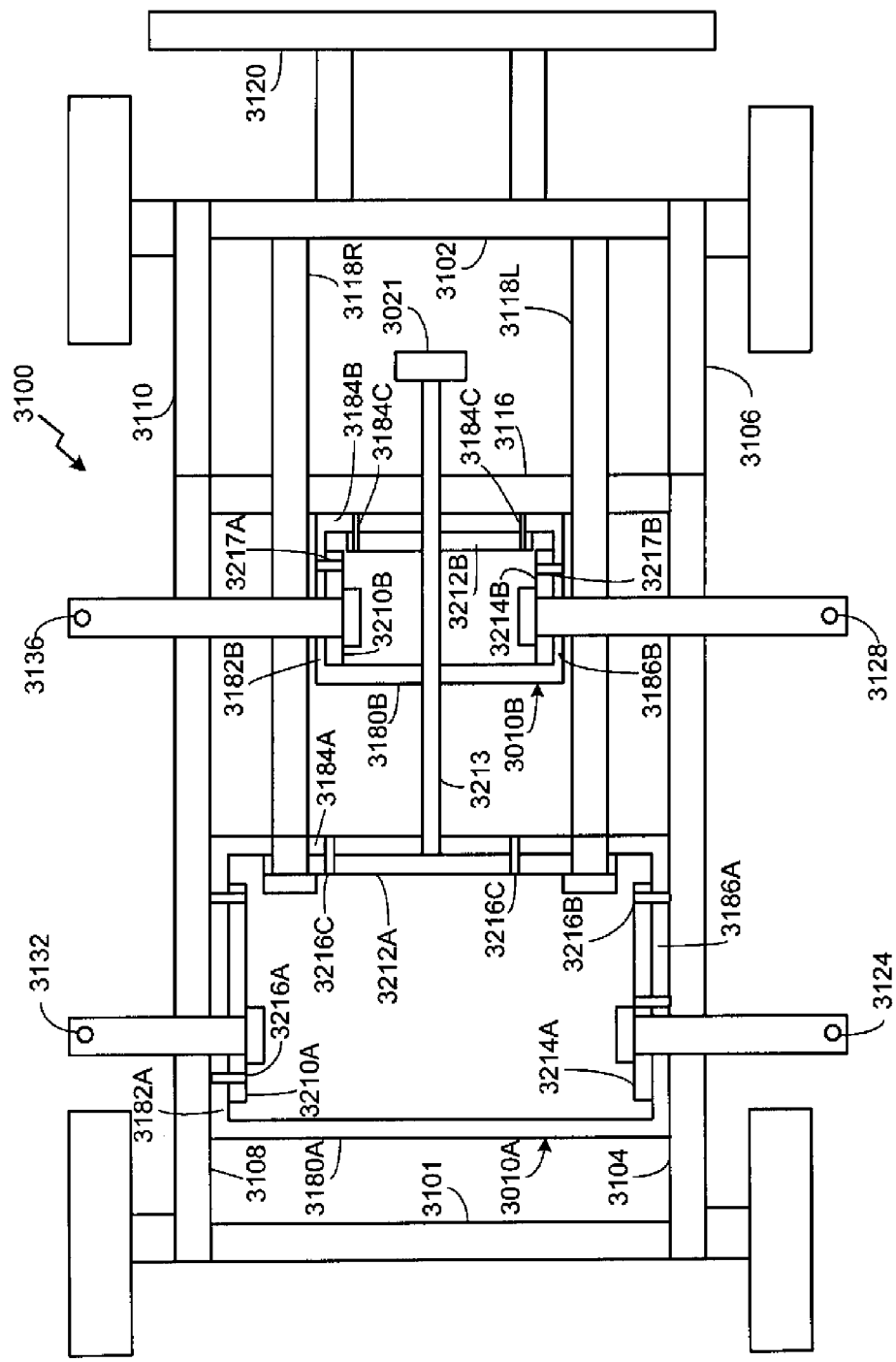
FIG. 14 is an illustration of a top view of an assembly, in accordance with a fourth exemplary embodiment of the present invention.

FIG. 14 is an illustration of a top view of an assembly 3100, in accordance with a fourth exemplary embodiment of the present invention. The fourth exemplary embodiment includes two crumple boxes, a front crumple box 3010A and a rear crumple box 3010B. The front crumple box 3010A is longer in the front to back dimension than the rear crumple box 3010B.

The assembly 3100 is shown in an extended mode in FIG. 14, wherein a rear bumper 3120 and a rear bumper beam 3102 are slidably moved to their rearmost position. A plurality of side bumpers 3124, 3128, 3132, 3136 are similarly in their extended position.

A proximal end of a front bumper beam 3101 is connected to a left side rail 3104, which is connected slidably to a left movable side rail 3106. A distal end of the front bumper beam 3101 is connected to a right side rail 3108, which is connected slidably to a right movable side rail 3110. A distal end of a rear bumper beam 3102 is connected to the right movable side rail 3110 and a proximal end of the rear bumper beam 3102 is connected to the left moveable side rail 3106.

The front crumple box 3010A has a front side 3180A, a right side 3182A, a rear side 3184A, and a left side 3186A. A right plate 3210A and a left plate 3214A are attached to the right side 3182A and the left side 3186A by breakable bolts 3216A, 3216B. The front crumple box 3010A has a rear plate 3212A that is attached to the rear side 3184A by the breakable bolts 3216C. The rear plate 3212A is connected to two rear shafts 3118R, 3118L and attached to an extensional member 3213 that passes through a hole formed in the rear side 3184A of the front crumple box 3010A.

The rear crumple box 3010B has a front side 3180B, a right side 3182B, a rear side 3184B, and a left side 3186B. The rear crumple box 3010B has a right plate 3210B and a left plate 3214B which are attached to the right side 3182B and the left side 3186B by breakable bolts 3217A, 3217B. The rear crumple box 3010B also has a rear plate 3212B, which is attached to the rear side 3184B by breakable bolts 3184C. The extensional member 3213 passes through a hole formed in the rear plate 3212B of the rear crumple box 3010B and through a hole formed in the rear cross beam 3116 and terminates beyond the rear crumple box 3010B with a termination plate 3021. The hole formed in the rear side 3184B of the rear crumple box 3010B and the hole formed in the rear cross beam 3116 must be large enough and or shaped to allow the termination plate 3021 to pass therethrough and engage the rear plate 3212B during a rear collision.

When another vehicle hits rear bumper 3120 with a strong force (strong enough to break the breakable bolts 3216C that attach rear plate 3212A to the rear side 3184A of the front crumple box 3010A), the rear shafts 3118R, 3118L force the rear plate 3212A of the front crumple box 3010A through the crumple material in the front crumple box 3010A. The rear plate 3212A moves the extensional member 3213 forward and pulls the termination plate 3021 towards the hole formed in the rear cross beam 3116. When the termination plate 3021 reaches the rear plate 3212B, the rear plate 3212B will move forward through the crumple material in the rear crumple box 3010B. The distance from the rear cross beam 3116 to the termination plate 3021 is the distance that the rear crumple box 3010B is smaller (from front to rear) than the front crumple box 3010A.

If the side bumpers 3124, 3128, 3132, 3136 are hit by a strong collision, the breakable bolts 3216A, 3216B, 3217A, 3217B will break and allow the side plates 3210A, 3210B, 3214A, 3214B to move, as pistons, towards the center of the vehicle while compressing the energy absorbing material in the crumple boxes 3010A, 3010B. While the side bumpers 3124, 3128, 3132, 3136 are discussed collectively, a side impact may only affect one or two of the bumpers 3124, 3128, 3132, 3136 and will likely not affect all four, thus only moving the side plates 3210A, 3210B, 3214A, 3214B attached to the affected bumpers 3124, 3128, 3132, 3136. If the side bumpers 3124, 3128, 3132, 3136 are hit by a minor force, the breakable bolts 3216A, 3216B, 3217A, 3217B will not break and the side plates 3210A, 3210B, 3214A, 3214B will not move and the energy absorbing material in the crumple boxes 3010A, 3010B will not be compressed and damaged.

FIG. 15 is a perspective view of a portion of an assembly 4100, in accordance with a fifth exemplary embodiment of the present invention. Upper and lower shafts 4122U, 4122L, support a left front side bumper 4124 and pass through a plurality of brackets 4610. The brackets 4610 are attached to a left side rail 4104. While FIG. 15 illustrates only brackets 4610 for only one bumper 4124, one having ordinary skill in the art would understand how the brackets could be applied similarly for all of the bumpers and their corresponding shafts.

FIG. 15A is a detail view of a portion of the assembly 4100 shown in FIG. 15, in accordance with the fifth exemplary embodiment of the present invention. FIG. 15A is a side section view of the left front upper shaft 4122U held between the bracket 4610 and the left side rail 4104. A bushing may be placed between the bracket 4160 and the left front upper shaft 4122U in order to reduce vibration of the left front upper shaft 4122U. The bushing may be composed of nylon or another compressible material. Any other brackets 4610 utilized to receive side bumper shafts may similarly include bushings.

The reinforcing brackets 4610 increase the integrity of the upper and lower shafts 4122U, 4122L. In particular, if the side bumper 4124 is struck at an angle, the brackets 4610 may prevent an instantaneous separation of the upper and lower shafts 4122U, 4122L from an attachment to the crumple box (not shown) and the shafts 4122U, 4122L are held in place so that the shafts 4122U, 4122L will bend and thereby absorb collision energy over a distance. An aperture of the bracket 4610 may be larger than the shaft 4122U that passes through the bracket 4610 in order to facilitate shaft 4122U motion during a collision in a direction that is at least partially not parallel to the axis of the shaft 4122U.

FIG. 16 is a perspective view of a portion of the vehicle 5103, in accordance with a sixth exemplary embodiment of the present invention. FIG. 16 shows the left front side bumper 5124 retracted into an indentation 5800 in a side of the vehicle 5103. While only one side bumper 5124 is shown, the indentation 5800 could similarly be provided for a plurality of side bumpers.

FIG. 17 is an illustration of a side bumper 6124, in accordance with a seventh exemplary embodiment of the present invention. The side bumper 6124 includes an upper extension 6810 that slidably moves upwards and a lower extension 6820 that slidably moves downwards. Lights 6840U, 6840L attach to the side bumper 6124. The extensions 6810, 6820 lengthens coverage of the bumper 6124 on the vehicle (not shown) for extra protection from colliding vehicles that have higher or lower bumpers. The side bumper 6124 and the extensions 6810, 6820 may have an aerodynamic shape to avoid excess drag on the vehicle at high speeds. Lights 6840U, 6840L added to the side bumper 6124 and may make the side bumper 6124 more visible to other drivers.

FIG. 18 shows a pair of side bumpers 7124, 7128, in accordance with an eighth exemplary embodiment of the present invention. A left front side bumper 7124 and a left rear side bumper 7128 are connected by a running board 7830. The running board 7830 can be retracted and stowed beneath the vehicle (not shown) so that passengers can get in and out of the vehicle without impediments.

Figure 19:
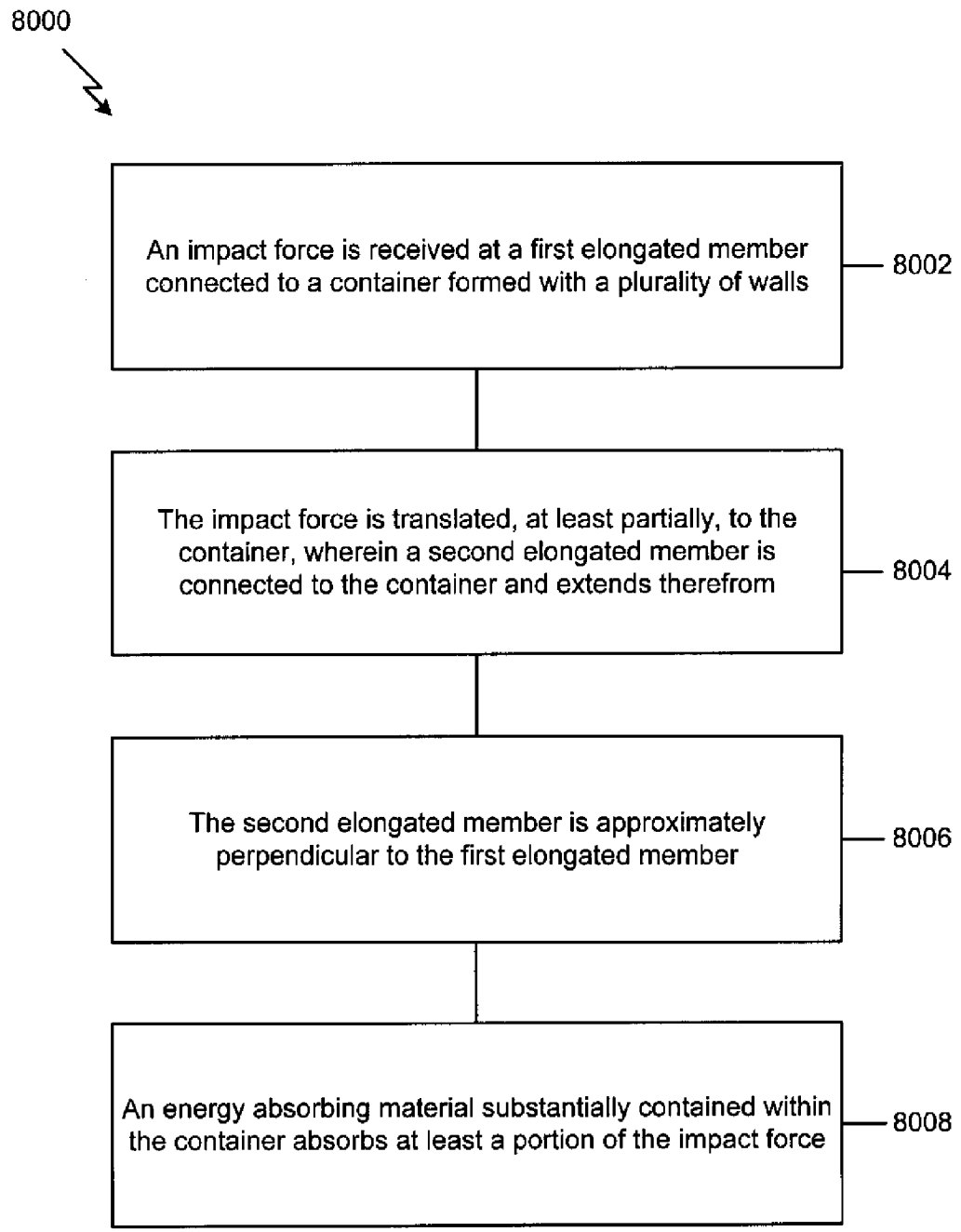
FIG. 19 is a flowchart illustrating a method of absorbing impact energy in accordance with the second exemplary embodiment of the invention.

FIG. 19 is a flowchart 8000 illustrating a method of absorbing impact energy in accordance with the second exemplary embodiment of the invention. It should be noted that any process descriptions or blocks in flow charts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 8002, an impact force is received at a first elongated member 1118L connected to a container 1010 formed with a plurality of walls. The impact force is translated, at least partially, to the container 1010, wherein a second elongated member 1124 is connected to the container 1010 and extends therefrom (block 8004). The second elongated member 1124 is approximately perpendicular to the first elongated member 1118L (block 8006). An energy absorbing material substantially contained within the container 1010 absorbs at least a portion of the impact force (block 8008).

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method of absorbing impact energy, the method comprising the steps of:
   receiving an impact force at a first bumper connected to a distal end of a first elongated member, the first elongated member having a proximate end proximate to a first face of a container;
   translating the impact force, at least partially, from the first bumper, through the first elongated member to the container, providing a second elongated member having a proximate end and a distal end, the proximate end proximate and approximately perpendicular to a second face of the container and the distal end connected to a second bumper, wherein a long axis of the second elongated member intersects the second face, wherein the second elongated member is approximately perpendicular to the first elongated member; and
   absorbing at least a portion of the impact force with an energy absorbing material substantially contained within the container.

2. The method of claim 1, wherein the step of translating the impact force further comprises compressing the energy absorbing material with a piston connected to the first elongated member.

3. The method of claim 1, further comprising the step of extending the first bumper connected to the first elongated member a material distance from a vehicle, wherein the container is connected to the vehicle.

4. The method of claim 1, further comprising restraining an initial movement of the first elongated member, relative to receiving the impact force, with at least one breakable bolt.

5. The method of claim 1, further comprising translating the impact force to both the container and a second container.

6. The method of claim 1, further comprising the step of enlarging a distance between a front axle and a rear axle by moving the second elongated member.

7. The method of claim 6, further comprising the step of initiating a motor to move a gear that moves the second elongated member.

8. The method of claim 1, wherein the first bumper further comprises a side bumper.

9. The method of claim 8, further comprising the step of retracting the side bumper.

10. The method of claim 8, further comprising the step of retracting the side bumper into a recessed cavity.

11. The method of claim 8, further comprising illuminating the side bumper.

12. The method of claim 1, further comprising the steps of:
   extending the first bumper connected to the first elongated member a material distance from a vehicle, wherein the container is connected to the vehicle and wherein the first elongated member remains proximate to the container;
   locking the first elongated member into a fixed position relative to the container.

13. The method of claim 1, wherein the first face is substantially perpendicular to the second face.

14. A method of absorbing impact energy, the method comprising the steps of:
   receiving an impact force at a first bumper connected to a distal end of a first elongated member, the first elongated member having a proximate end proximate to a first face of a container;
   translating the impact force, at least partially, from the first bumper, through the first elongated member to the container, providing a second elongated member having a proximate end and a distal end, the proximate end proximate and approximately perpendicular to a second face of the container and the distal end connected to a second bumper, wherein a long axis of the second elongated member intersects the second face, wherein the second elongated member is approximately perpendicular to the first elongated member;
   absorbing at least a portion of the impact force with an energy absorbing material substantially contained within the container;
   translating the impact force further comprises the step of pressing a piston into the energy absorbing material, wherein the piston is connected to the first elongated member; and
   sliding the first elongated member relative to the piston.

15. The method of claim 1, further comprising the step of breaking at least one breakable bolt restraining mobility of the first elongated member with the impact force.

16. The method of claim 1, wherein the step of receiving an impact force further comprises receiving the impact force at a plurality of first elongated members partially enclosed within the container, wherein the first elongated members are parallel.

17. The method of claim 16, wherein the first elongated members are connected to at least one side bumper.

18. The method of claim 16, further comprising the step of moving the first elongated members to extend the first bumper attached to the elongated members, wherein the elongated members move in approximate unison.

19. A method of absorbing impact energy, the method comprising the steps of:
   receiving an impact force at a first elongated member partially enclosed within a container formed with a plurality of walls;
   translating the impact force, at least partially, from the first elongated member to the container, providing a second elongated member partially enclosed within the container and extending therefrom, wherein the second elongated member is approximately perpendicular to the first elongated member; and
   absorbing at least a portion of the impact force with an energy absorbing material substantially contained within the container.

20. The method of claim 19, further comprising the steps of:
   extending a first bumper connected to the first elongated member a material distance from a vehicle, wherein the container is connected to the vehicle and wherein the first elongated member remains at least partially within the container;
   locking the first elongated member into a fixed position relative to the container.

* * * * *